(12) United States Patent
Zeine et al.

(10) Patent No.: US 11,031,822 B2
(45) Date of Patent: Jun. 8, 2021

(54) INTEGRATED CIRCUITS FOR TRANSMITTING WIRELESS POWER, RECEIVING WIRELESS POWER, AND/OR COMMUNICATING WIRELESSLY

(71) Applicant: Ossia Inc., Bellevue, WA (US)

(72) Inventors: Hatem Zeine, Bellevue, WA (US); Prithvi Shylendra, Seattle, WA (US); Anthony L. Johnson, Edmonds, WA (US); Douglas Wayne Williams, Bellevue, WA (US); Dale Mayes, Bothell, WA (US)

(73) Assignee: Ossia Inc., Redmond, WA (US)

( * ) Notice: Subject to any disclaimer, the term of this patent is extended or adjusted under 35 U.S.C. 154(b) by 976 days.

(21) Appl. No.: 15/384,250

(22) Filed: Dec. 19, 2016

(65) Prior Publication Data

US 2017/0141621 A1 May 18, 2017

Related U.S. Application Data

(63) Continuation of application No. 15/354,998, filed on Nov. 17, 2016, now Pat. No. 9,866,074.

(60) Provisional application No. 62/256,694, filed on Nov. 17, 2015.

(51) Int. Cl.
*H02J 50/20* (2016.01)
*H02J 7/02* (2016.01)
*H04B 5/00* (2006.01)
*H02J 50/40* (2016.01)
*H02J 7/34* (2006.01)

(52) U.S. Cl.
CPC ............. *H02J 50/20* (2016.02); *H02J 7/025* (2013.01); *H02J 50/40* (2016.02); *H04B 5/0037* (2013.01); *H02J 7/342* (2020.01)

(58) Field of Classification Search
CPC .. H02J 50/20; H02J 7/025; H02J 50/40; H02J 7/0054; H04B 5/0037
USPC .......................................... 307/104; 320/108
See application file for complete search history.

(56) References Cited

U.S. PATENT DOCUMENTS

| | | | |
|---|---|---|---|
| 10,291,055 B1* | 5/2019 | Bell | H02J 7/025 |
| 2010/0142509 A1 | 6/2010 | Zhu et al. | |
| 2011/0151789 A1 | 6/2011 | Viglione et al. | |
| 2012/0146576 A1* | 6/2012 | Partovi | H02J 50/12 320/108 |

(Continued)

FOREIGN PATENT DOCUMENTS

| | | |
|---|---|---|
| WO | 2015077730 A1 | 5/2015 |
| WO | 2015112514 A2 | 7/2015 |

OTHER PUBLICATIONS

International Application No. PCT/US2016/062622, International Search Report & Written Opinion, 11 pages, dated Feb. 23, 2017.

*Primary Examiner* — Rexford N Barnie
*Assistant Examiner* — Thai H Tran

(57) ABSTRACT

The disclosed technology relates to wireless communication and wireless power transmission. In some implementations, the disclosed technology is directed to an integrated circuit having a transmitter that transmits radio frequency (RF) based wireless power and receives signals for detecting the location of a client device. The disclosed technology is also directed to an integrated circuit for a client device that receives power from the transmitter and transmits beacon signals, which the transmitter can use to locate the client device.

21 Claims, 19 Drawing Sheets

(56) References Cited

U.S. PATENT DOCUMENTS

| | | | |
|---|---|---|---|
| 2012/0306284 A1* | 12/2012 | Lee | H02J 50/40 |
| | | | 307/104 |
| 2014/0004912 A1* | 1/2014 | Rajakarunanayake | ...................... |
| | | | H04W 52/265 |
| | | | 455/573 |
| 2014/0175893 A1* | 6/2014 | Sengupta | H01Q 21/225 |
| | | | 307/104 |

* cited by examiner

INTEGRATED CIRCUITS FOR TRANSMITTING WIRELESS POWER, RECEIVING WIRELESS POWER, AND/OR COMMUNICATING WIRELESSLY

CROSS-REFERENCE TO RELATED APPLICATION

This application is a continuation of U.S. patent application Ser. No. 15/354,998, filed on Nov. 17, 2016, titled "INTEGRATED CIRCUITS FOR TRANSMITTING WIRELESS POWER, RECEIVING WIRELESS POWER, AND/OR COMMUNICATING WIRELESSLY," which claims priority to U.S. Provisional Application No. 62/256,694, filed Nov. 17, 2015, titled "INTEGRATED CHIPS INCORPORATING TRANSCEIVER COMPONENTS FOR REMOTE WIRELESS POWER DELIVERY AND FOR RECEIVING WIRELESS POWER," which are hereby incorporated by reference for their entireties.

BACKGROUND

Many portable electronic devices are powered by batteries. Rechargeable batteries are often used to avoid the cost of replacing conventional dry-cell batteries and to conserve resources. However, recharging batteries with conventional rechargeable battery chargers requires access to an alternating current (AC) power outlet, which is sometimes not available or not convenient.

Accordingly, a need exists for technology that overcomes the problem demonstrated above, as well as one that provides additional benefits. Other limitations of existing or prior systems will become apparent to those of skill in the art upon reading the following Detailed Description.

DETAILED DESCRIPTION

Figure 1:
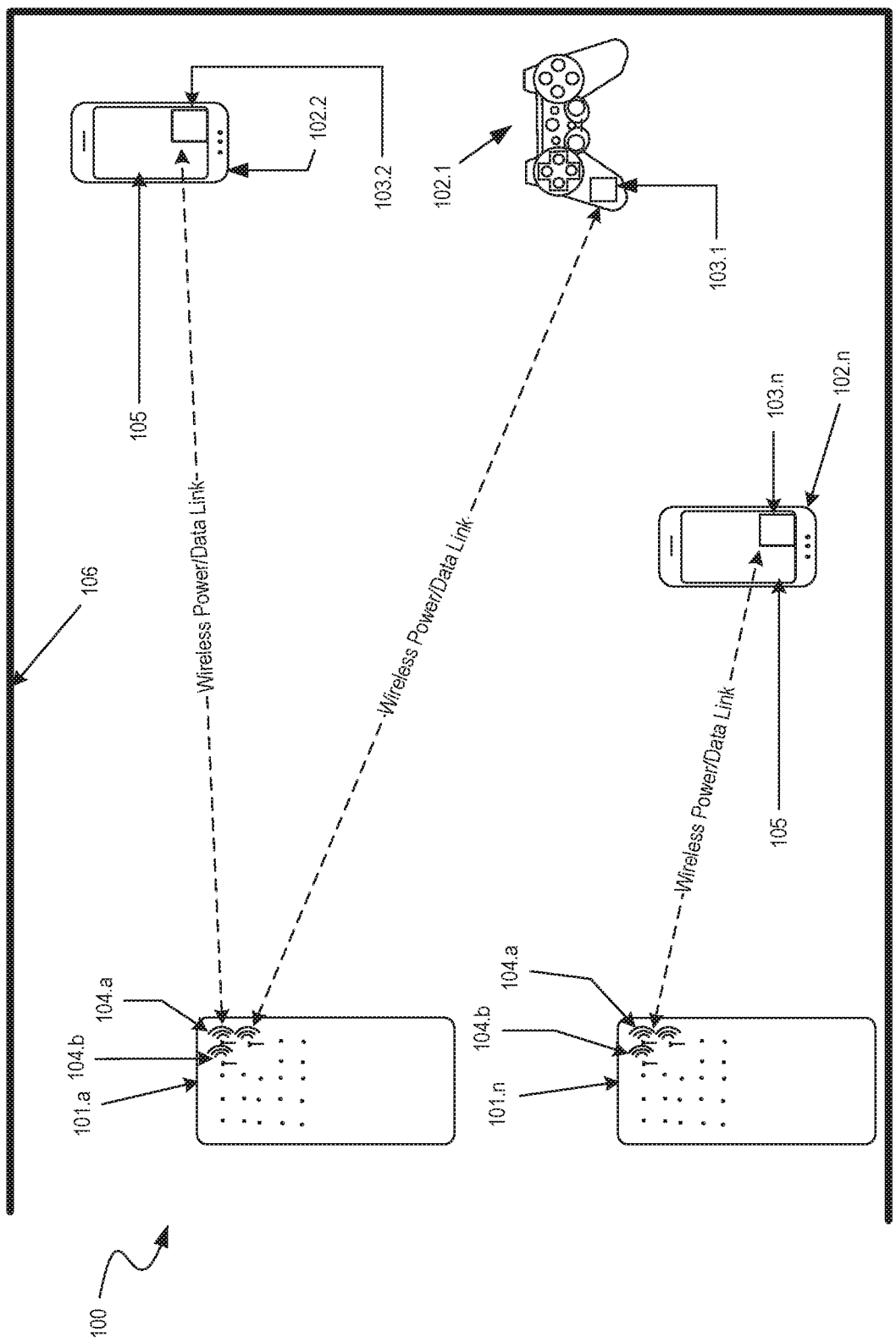
FIG. 1 is a diagram illustrating a wireless power delivery environment in accordance with implementations of the disclosed technology.

The disclosed technology relates to wireless communication and wireless power transmission. In some implementations, the disclosed technology includes a wireless power delivery system with a charger and receiver. The charger can detect the location of the receiver, where the receiver is physically coupled to a client device (e.g., smart phone). The charger can also transmit radio frequency (RF)-based wireless power to the receiver based on the detected location of the receiver. The charger includes an integrated circuit for transmitting wireless power and receiving location information from a client device. Similarly, the receiver includes an integrated circuit for receiving wireless power and transmitting location information to the charger. The integrated circuits for the charger and receiver are described in further detail herein (e.g., in FIGS. 5-17).

The Detailed Description includes three sections. Section I, titled "System Overview and Architecture," describes the wireless power delivery system with the charger and the receiver. Section II, titled "Charger Chip Technology," describes an integrated circuit that can be incorporated into the charger. Section III, "Client Chip Technology," describes an integrated circuit for the receiver. The integrated circuits described in Sections II and III can be incorporated into the technology disclosed in Section I.

The following description and drawings are illustrative, and are not to be construed as limiting. Numerous specific details are described to provide a thorough understanding of the disclosure. However, in certain instances, well-known or conventional details are not described in order to avoid obscuring the description. References to "one" or "an" embodiment in the present disclosure can be, but are not necessarily, references to the same embodiment, and such references mean at least one of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The terms used in this specification generally have their ordinary meanings in the art within the context of the disclosure and in the specific context where each term is used. Certain terms that are used to describe the disclosure are discussed below, or elsewhere in the specification, to provide additional guidance to the practitioner regarding the description of the disclosure. For convenience, certain terms may be highlighted, for example, using italics and/or quotation marks. The use of highlighting has no influence on the scope and meaning of a term; the scope and meaning of a term is the same, in the same context, whether or not it is highlighted. It will be appreciated that the same thing can be said in more than one way.

Consequently, alternative language and synonyms may be used for any one or more of the terms discussed herein, and no special significance is meant when a term is elaborated upon herein. Synonyms for certain terms are provided. A recital of one or more synonyms does not exclude the use of other synonyms. The use of examples anywhere in this specification, including examples of any terms discussed herein, is illustrative only, and is not intended to further limit the scope and meaning of the disclosure or of any term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for convenience of the reader and in no way limit the scope of the disclosure. Unless otherwise defined, all technical and scientific terms used herein have the same meaning as commonly understood by one of ordinary skill in the art to which this disclosure pertains. In the case of conflict, the present document, including definitions, will control.

The techniques described herein utilize wireless technologies to deliver power, data, or both. In some embodiments, power, data, or both, may be delivered simultaneously as a continuous complex waveform, as a pulsed waveform, as multiple overlapping waveforms, or combinations or variations thereof. The power and data may be delivered using the same or different wireless technologies.

The wireless technologies described herein may apply to not only electromagnetic (EM) waves, but also to sound waves, and/or other forms of periodic excitations (e.g., phonons). EM waves may include radio waves, microwaves, infrared radiation, visible light, ultraviolet radiation, X-rays, and/or gamma rays. Sound waves may include infrasound waves, acoustic waves, and/or ultrasound waves. The techniques described herein may simultaneously utilize multiple wireless technologies and/or multiple frequency spectrums within a wireless technology to deliver the power, data, or both.

The wireless technologies may include dedicated hardware components to deliver power and/or data. The dedicated hardware components may be modified based on the wireless technology, or a combination of wireless technologies, being utilized. For example, when applied to sound waves, the system employs microphones and speakers rather than antennas.

System Overview and Architecture

FIG. 1 is a diagram illustrating a wireless communication/power delivery environment 100 in accordance with implementations of the disclosed technology. More specifically, FIG. 1 illustrates the wireless power delivery environment 100 in which wireless power and/or data can be delivered to available wireless devices 102.1-102.n (also referred to as "client devices") having one or more power receiver clients 103.1-103.n (also referred to herein as "wireless power receivers", "wireless power clients", or "receivers"). The wireless power receivers are configured to receive wireless power from one or more wireless transmitters 101.

As shown in FIG. 1, the wireless devices 102.1-102.n are mobile phone devices 102.2 and 102.n, respectively, and a wireless game controller 102.1, although the wireless devices 102.1-102.n can be any (smart or dumb) wireless device or system that needs power and is capable of receiving wireless power via one or more integrated power receiver clients 103.1-103.n. Smart devices are electronic devices that can communicate (e.g., using WiFi) and transmit beacon signals. Dumb devices are electronic devices that are passive devices that may not communicate (e.g., no Bluetooth or Wifi capability) and may not transmit a beacon signal. As discussed herein, the one or more integrated power receiver clients or "wireless power receivers" receive and process power from one or more transmitters/transmitters 101.a-101.n and provide the power to the wireless devices 102.1-102.n for operation thereof.

Each transmitter 101 (also referred to herein as a "charger", "array of antennas" or "antenna array system") can include multiple antennas 104, e.g., an antenna array including hundreds or thousands of spaced-apart antennas, that are each capable of delivering wireless power to wireless devices 102. Each transmitter 101 may also deliver wireless communication signals to wireless devices 102. In some embodiments, the wireless power and wireless communication signals may be delivered as a combined power/communication signal. Indeed, while the detailed description provided herein focuses on wirelessly transmitting power, aspects of the invention are equally applicable to wirelessly transmitting data.

In some embodiments, the antennas are adaptively-phased RF antennas and the transmitter 101 utilizes a novel phase shifting algorithm as described in one or more of U.S. Pat. Nos. 8,558,661, 8,159,364, 8,410,953, 8,446,248, 8,854,176, U.S. patent application Ser. Nos. 14/461,332 and 14/815,893, which are hereby incorporated by reference in their entireties. The transmitter 101 is capable of determining the appropriate phases to deliver a coherent power transmission signal to the power receiver clients 103. The array is configured to emit a signal (e.g., continuous wave or pulsed power transmission signal) from multiple antennas at a specific phase relative to each other.

Additionally, the transmitter 101 may include a time delayed retro directive RF holographic array that delivers wireless RF power that matches the client antenna patterns in three dimensional (3D) space (polarization, shape, & power levels of each lobe). It is appreciated that use of the term "array" does not necessarily limit the antenna array to any specific array structure. That is, the antenna array does not need to be structured in a specific "array" form or geometry. Furthermore, as used herein he term "array" or "array system" may be used include related and peripheral circuitry for signal generation, reception, and transmission, such as radios, digital logic, and modems.

The wireless devices 102 can include one or more power receiver clients 103 (also known as a "wireless power receiver"). As illustrated in the example of FIG. 1, power delivery antennas 104a and data communication antennas 104b are shown. The power delivery antennas 104a are configured to provide delivery of wireless power in the wireless power delivery environment. The data communication antennas are configured to send data communications to, and receive data communications from, the power receiver clients 103.1-103 and/or the wireless devices 102.1-102.n. In some embodiments, the data communication antennas can communicate via Bluetooth™, WiFi, ZigBee™, or other wireless communication protocols.

Each power receiver client 103.1-103.n includes one or more antennas (not shown) for receiving signals from the transmitters 101. Likewise, each transmitter 101.a-101.n includes an antenna array having one or more antennas and/or sets of antennas capable of emitting continuous wave signals at specific phases relative to each other. As discussed above, each array is capable of determining the appropriate phases for delivering coherent signals to the power receiver clients 102.1-102.n. For example, coherent signals can be determined by computing a complex conjugate of a received beacon signal at each antenna of the array such that the coherent signal is properly phased for the particular power receiver client that transmitted the beacon signal, though coding other that use of the complex conjugate may be used. The beacon signal, which is primarily referred to herein as a continuous waveform, can alternatively or additionally take the form of a modulated signal.

Although not illustrated, each component of the environment, e.g., wireless power receiver, transmitter, etc., can include control and synchronization mechanisms, such as a data communication synchronization module. The transmitters 101.a-101.n are connected to a power source such as, for example, a power outlet or source connecting the transmitters to a standard or primary alternating current (AC) power supply in a building. Alternatively or additionally, one or more of the transmitters 101.a-101.n can be powered by a battery or via other power providing mechanism.

In some embodiments, the power receiver clients 102.1-102.n and/or the transmitters 101.a-101.n utilize or encounter reflective objects 106 such as, for example, walls or other RF reflective obstructions within range to beacon and deliver and/or receive wireless power and/or data within the wireless power delivery environment. The reflective objects 106 can be utilized for multi-directional signal communication regardless of whether a blocking object is in the line of sight between the transmitter and the power receiver client.

As described herein, each wireless device 102.1-102.n can be any system and/or device, and/or any combination of devices/systems that can establish a connection with another device, a server, and/or other systems within the example environment 100. In some embodiments, the wireless devices 102.1-102.n include displays or other output functionalities to present data to a user and/or input functionalities to receive data from the user. By way of example, a wireless device 102 can be, but is not limited to, a video game controller, a server desktop, a desktop computer, a computer cluster, a mobile computing device such as a notebook, a laptop computer, a handheld computer, a mobile phone, a smart phone, a battery or component coupled to a battery, a PDA, a wearable electronic device, a light fixture, electrical device embedded in a system (e.g., automobile), etc. The wireless device 102 can also be any wearable device such as watches, necklaces, rings, or even devices embedded on or within the customer. Other examples of a wireless device 102 include, but are not limited to, safety sensors (e.g., fire or carbon monoxide), electric toothbrushes, electronic door locks/handles, electric light switch controllers, electric shavers, etc.

Although not illustrated in the example of FIG. 1, the transmitter 101 and the power receiver clients 103.1-103.n can each include a data communication module for communication via a data channel. Alternatively or additionally, the power receiver clients 103.1-103.n can direct the wireless devices 102.1-102.n to communicate with the transmitter via existing data communications modules.

Figure 2:
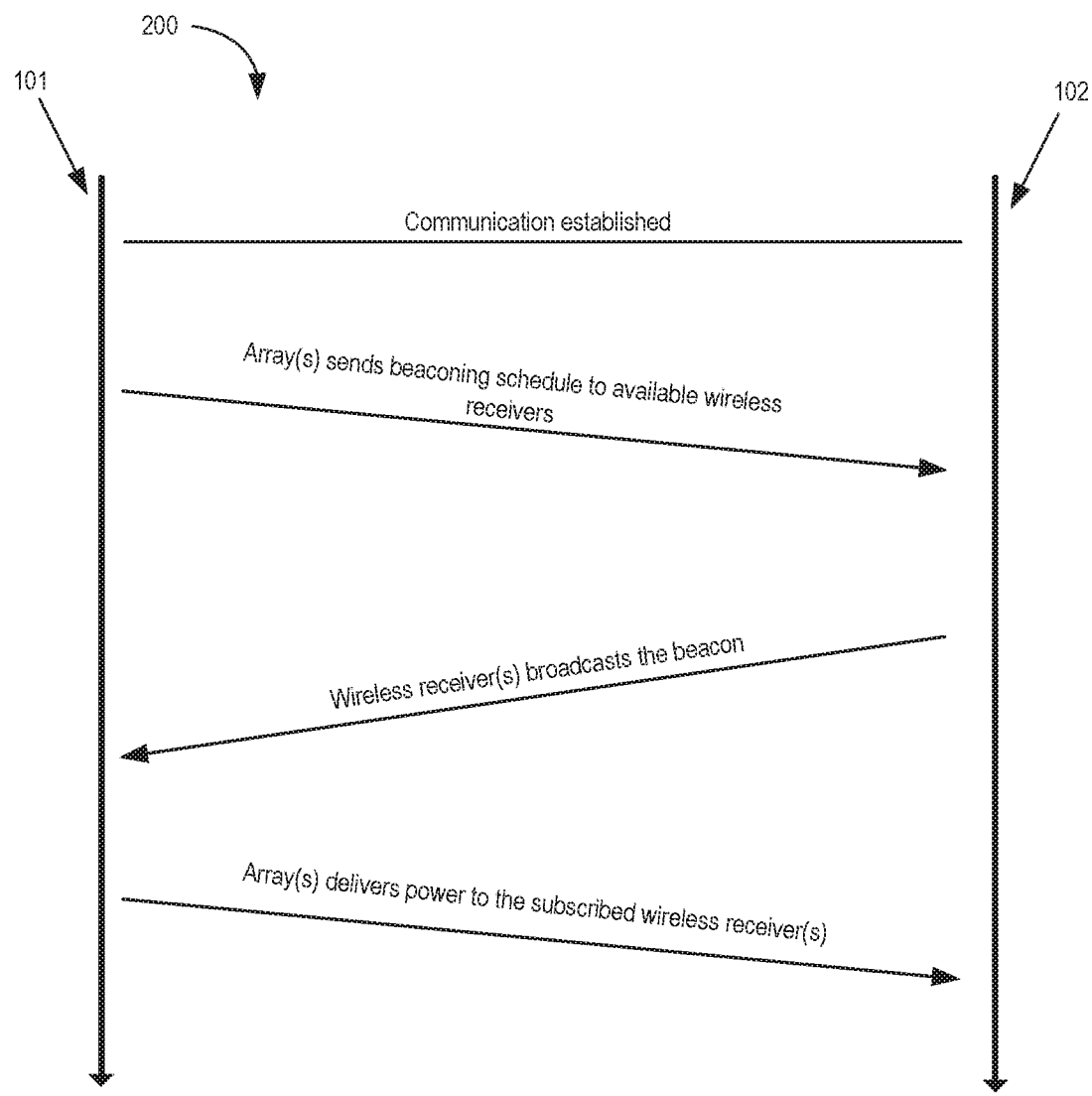
FIG. 2 is a sequence diagram illustrating operations between a wireless transmitter and a power receiver client for commencing wireless power delivery.

FIG. 2 is a sequence diagram 200 illustrating example operations between a wireless transmitter 101 and a power receiver client 103 for commencing wireless power delivery, according to an embodiment. Initially, communication is established between the transmitter 101 and the power receiver client 103, such as communication via Bluetooth™, WiFi, ZigBee™, or other wireless communication protocols. The transmitter 101 subsequently sends a beacon schedule to the power receiver client 103 to arrange beacon broadcasting and RF power/data delivery schedules with this and any other power receiver clients. Based on the schedule, the power receiver client 103 broadcasts the beacon. As shown, the transmitter 101 receives the beacon from the power receiver client 103 and detects the phase (or direction) at which the beacon signal was received. The transmitter 101 then delivers wireless power and/or data to the power receiver client 103 based the phase (or direction) of the received beacon. That is, the transmitter 101 determines the complex conjugate of the phase and uses the complex conjugate to deliver power to the power receiver client 103 in the same direction in which the beacon signal was received from the power receiver client 103.

In some embodiments, the transmitter 101 includes many antennas; one or more of which are used to deliver power to the power receiver client 103. The transmitter 101 can detect phases of the beacon signals that are received at each antenna. The large number of antennas may result in different beacon signals being received at each antenna of the transmitter 101. The transmitter may then utilize the algorithm or process described in one or more of U.S. Pat. Nos. 8,558,661, 8,159,364, 8,410,953, 8,446,248, 8,854,176, and U.S. Provisional Patent Application Nos. 62/146,233 and 62/163,964, which are hereby incorporated by reference in their entireties. The algorithm or process determines how to emit signals from one or more antennas that takes into account the effects of the large number of antennas in the transmitter 101. In other words, the algorithm determines how to emit signals from one or more antennas in such a way as to create an aggregate signal from the transmitter 101 that approximately recreates the waveform of the beacon, but in the opposite direction.

The transmitter 101 can include a housing structure. The housing structure is disclosed in more detail U.S. patent application Ser. No. 15/289,117, titled "ANTENNA CONFIGURATIONS FOR WIRELESS POWER AND COMMUNICATION, AND SUPPLEMENTAL VISUAL SIGNALS," which is hereby incorporated by reference in its entirety. As disclosed in the application, the transmitter 101 is moveable. Moveable generally means the transmitter can be readily lifted by a human and moved to another location (e.g., in a room). In some implementations, the transmitter 101 can be plugged into a standard 12V outlet in home or commercial structure.

Figure 3:
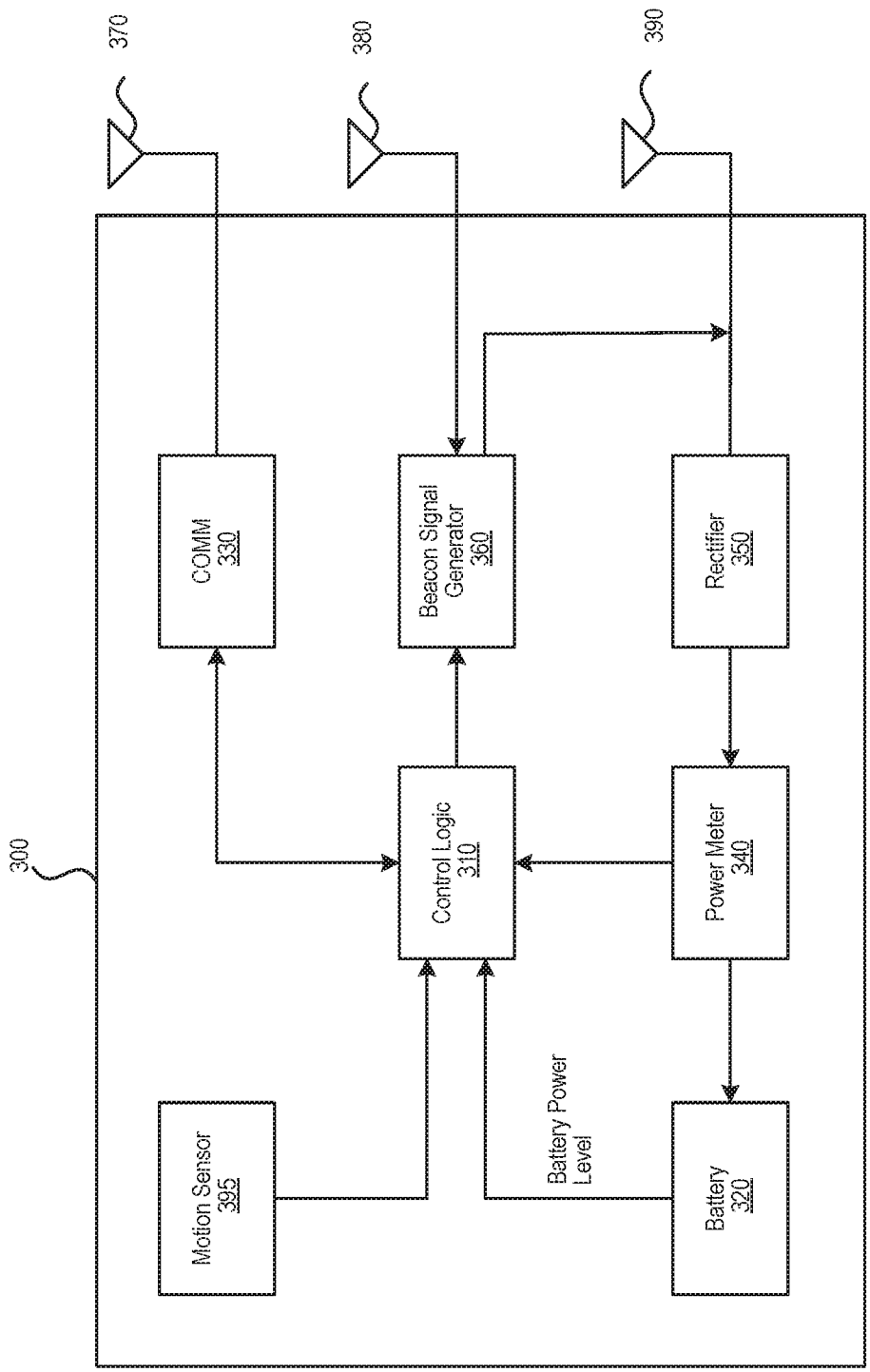
FIG. 3 is a block diagram illustrating a wireless power receiver in accordance with implementations of the disclosed technology.

FIG. 3 is a block diagram illustrating an example receiver 300 in accordance with implementations of the disclosed technology. The receiver 300 includes various components including control logic 310, battery 320, communication block 330 and associated antenna 370, power meter 340, rectifier 350, beacon signal generator 360 and an associated antenna 380, and switch 365 connecting the rectifier 350 or the beacon signal generator 360 to an associated antenna 390. Some or all of the components can be omitted in some embodiments. Additional or fewer components are also possible.

The rectifier 350 receives (via one or more client antennas) the power transmission signal from the power transmitter, which is fed through the power meter 340 to the battery 320 for charging. The power meter 340 measures the total received power signal strength and provides the control logic 310 with this measurement. The control logic 310 also may receive the battery power level from the battery 320 itself or receive battery power data from, e.g., an API of an operating system running on the receiver 300. The control logic 310 may also transmit/receive, via the communication block 330, a data signal on a data carrier frequency, such as the base signal clock for clock synchronization. The beacon signal generator 360 transmits the beacon signal, or calibration signal, using either the antenna 380 or 390. It may be noted that, although the battery 320 is shown for being charged and for providing power to the receiver 300, the receiver may also receive its power directly from the rectifier 350. This may be in addition to the rectifier 350 providing charging current to the battery 320, or in lieu of providing charging. Also, it may be noted that the use of multiple antennas is one example of implementation and the structure may be reduced to one shared antenna, where the receiver multiplexes signal reception/transmission.

An optional motion sensor 395 detects motion and signals the control logic 310. For example, when a device is receiving power at high frequencies above 500 MHz, its location may become a hotspot of (incoming) radiation. So when the device is on a person, the level of radiation may exceed a regulation or exceed acceptable radiation levels set by medical/industrial authorities. To avoid any over-radiation issue, the device may integrate motion detection mechanisms such as accelerometers, assisted GPS, or other mechanisms. Once the device detects that it is in motion, the disclosed system assumes that it is being handled by a user and signals the power transmitting array either to stop transmitting power to it, or to lower the received power to an acceptable fraction of the power. In cases where the device is used in a moving environment like a car, train, or plane, the power might only be transmitted intermittently or at a reduced level unless the device is close to losing all available power.

Figure 4:
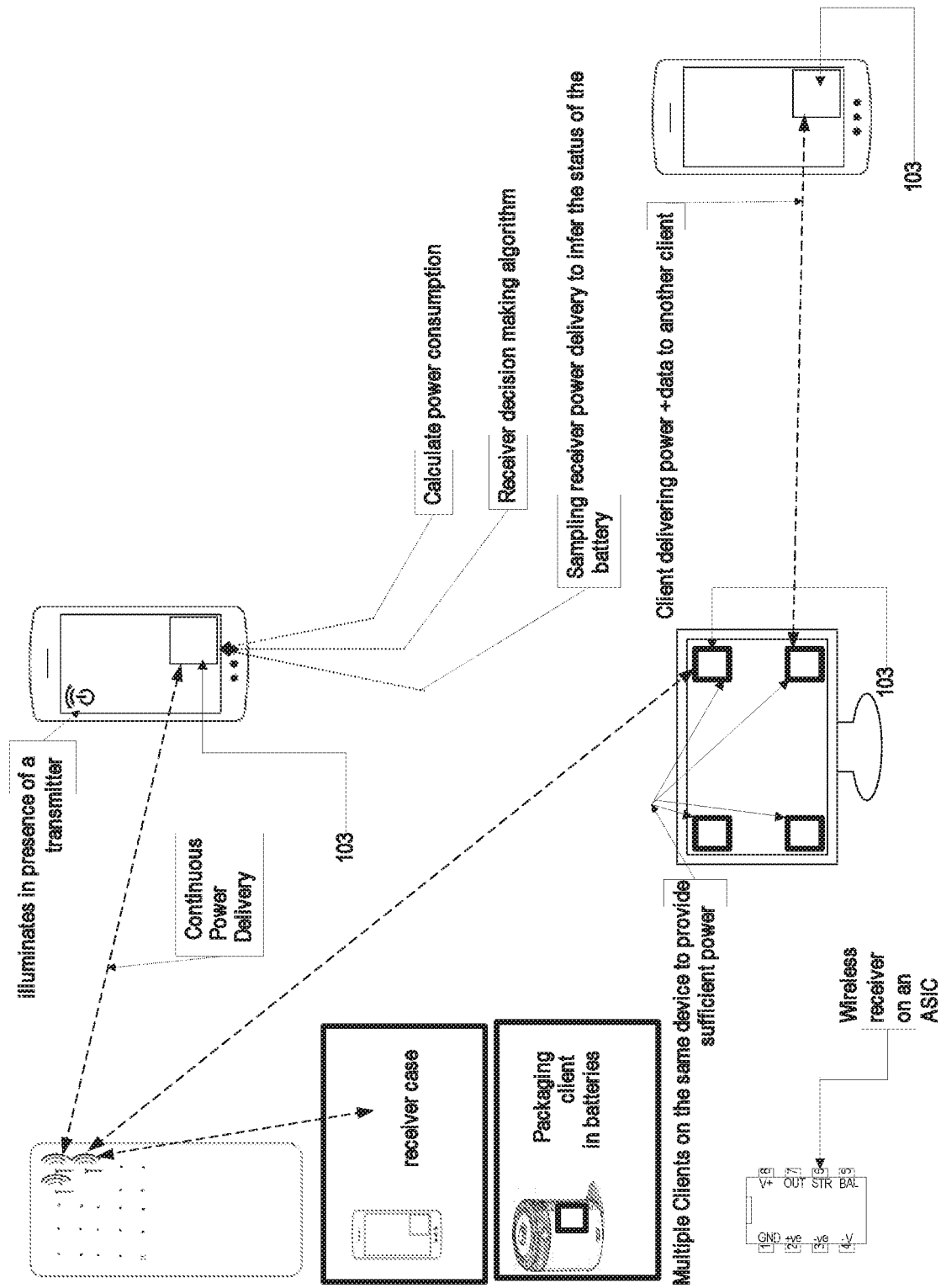
FIG. 4 is a system overview diagram in accordance with implementations of the disclosed technology.

FIG. 4 is a system overview in accordance with implementations of the disclosed technology. As shown, among other features, in some embodiments, the wireless power receiver can be in a form of an application specific integrated circuit (ASIC) chip, a mobile phone case, in a display device (e.g. computer monitor or television, which in turn may relay power to a nearby receiver 103), packaged within a standard battery form factor (e.g. AA battery), etc.

FIGS. 5-17 are schematic/block diagrams that depict suitable implementations of the invention. These Figures generally use conventional symbols and nomenclature, and thus, similar symbols and nomenclature have similar or identical functions. Certain circuit elements represented by possibly less familiar symbols or nomenclature are discussed herein in more detail. Without sacrificing clarity, but for brevity, and to orient one skilled in the art, certain portions of the Figure will be discussed in detail. From the detailed discussions of certain portions and circuit elements of the Figures, one skilled in the relevant art can readily understand how to practice aspects of the invention.

Charger Chip Technology

As described above in FIGS. 1-4, the transmitter can transmit wireless power to a client device. To transmit wireless power to the client device, the transmitter can use a charger chip or multiple charger chips. The charger chip receives a beacon signal from a receiver electrically coupled to the client device and uses the beacon signal for computing the location of the client device. Based on the computed location of the client device, the charger chip transmits RF-based wireless power to the client device using a transceiver, antenna port, phase detector, and phase shifter. More generally, the charger chip is considered a multiple input and multiple output transceiver that implements at least two functions: detecting the location of client devices and subsequently transmitting focused power to the client devices.

The charger chip can be composed of semiconductor material, such as Silicon, GaAs, Silicon on an insulator (SOI), or GaN. Manufacturers can fabricate the charger chip using semiconductor material and processing methods such as doping, ion implantation, etching, deposition of various materials, photolithographic patterning, dicing, and/or packaging. In some implementations, the charger chip is an ASIC. One or more charger chip ASICs can be integrated into the transmitter 101 shown in FIG. 1.

In some implementations, the charger chip can be electrically coupled to a processing unit in the transmitter to assist in the transmission of wireless power. For example, the charger chip can be coupled to a CPU or a field-programmable gate array ("FPGA") in the transmitter. The charger chip can communicate with the processing unit to determine received beacon signal phases at each antenna on the wireless transmitter, schedule power delivery to client devices, and assist client devices in beacon scheduling. In some implementations, the charger chip can communicate with the processing unit to determine the complex conjugate of the beacon signals received at each antenna. Using the complex conjugates, the charger chip can use one or more antenna ports coupled to off-chip antennas to emit a wireless power signal that approximately recreates the waveform of the beacon signal in the opposite direction. In some implementations, the processing unit instructs a phase shifter on the charger chip to adjust the phase of a transmitted wireless power signal (also referred to as a "recreated waveform") based on the received beacon signal.

In some implementations, the charger chip operates in industrial, scientific, and medial (ISM) frequency bands such as 2.4 to 2.483 GHz or 5.725 to 5.875 GHz. The charger chip can also operate at other ISM frequencies such as 24.00 GHz or suitable frequencies for transmitting and receiving wireless power. Schematic block diagrams of the charger chip and other integrated circuitry that function in ISM frequency bands are disclosed in more detail below with reference to FIGS. 5-12.

Figure 5:
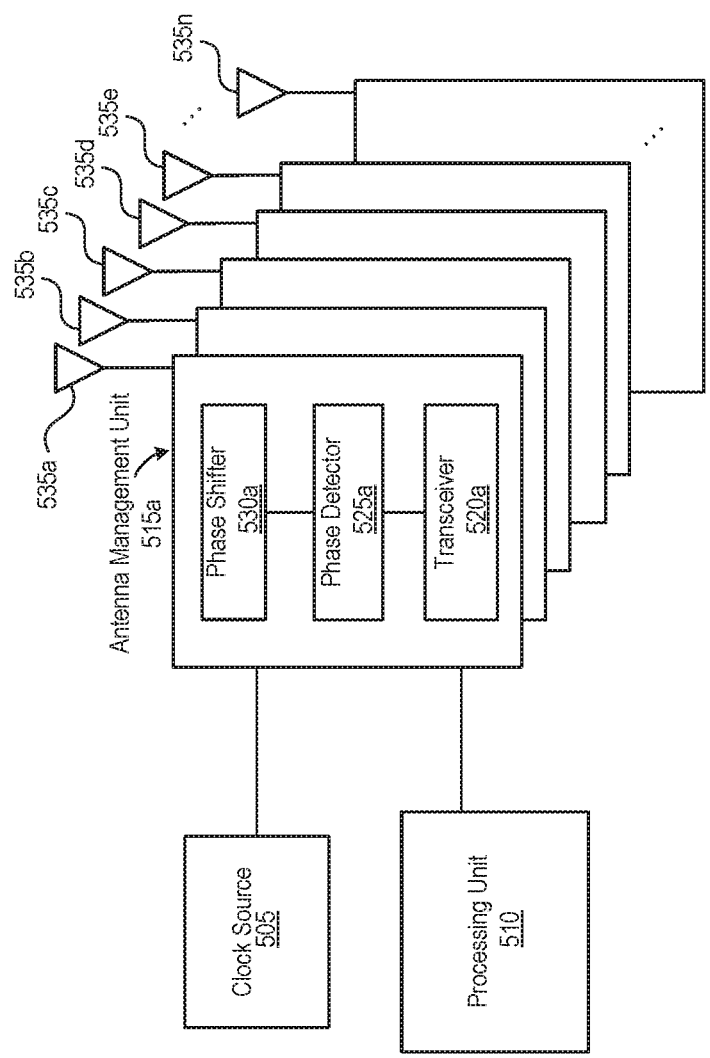
FIG. 5 is a schematic block diagram illustrating circuit components for transmitting wireless power and receiving communication signals from a client device in accordance with implementations of the disclosed technology.

FIG. 5 is a schematic block diagram illustrating components for transmitting wireless power and receiving communication signals from a client device. FIG. 5 includes a transceiver 520*a-n*, an antenna 535*a-n*, a phase detector 525*a-n*, a phase shifter 530*a-n*, a processing unit 510, and a clock source 505 (e.g., a phase-locked loop (PLL) unit or a delayed lock loop (DLL) unit). Here, n represents a natural number, which indicates there can be one or several components (e.g., "n" phase detectors or "n" antennas).

Collectively, a transceiver, phase detector, and phase shifter can be referred to as an antenna management unit (AMU) 515*a-n* and these components together form the charger chip along with additional circuitry to send and receive signals (e.g., antenna ports to antenna 535*a-n*, connections to the processing unit 510, connections to the clock source 505, and other circuitry such as grounds). In some implementations, each transceiver is configured to concurrently transmit an RF power waveform to a client device or multiple client devices. AMUs can also be referred to as antenna modules.

As a broad overview of the AMU 515*a-n*, each AMU can receive and amplify received beacon signals from client devices, decode beacon signals according to code controlled by the processing unit 510, detect beacon signal phases from a client device, send detected phase information to the processing unit 510, and deliver power to multiple client devices in time-slots according to a priority set by the processing unit 510. Also, each of the AMUs 515*a-n* can switch from transmitting a power signal to receiving a beacon signal or concurrently transmit wireless power and receive beacon signals (e.g., one antenna port transmitting and another antenna port receiving). For example, the transceiver 520*a* can switch antenna 535*a* between receiving beacon signals and transmitting wireless power based on control signals from the processing unit 510.

One or several AMUs can be integrated into the charger chip (e.g., 1-32 or more). The manufacturer's budget and the size of the wireless power transmitter affect the number of AMUs per charger chip. In general, increasing the number of AMUs per charger chip can increase the amount of power transmitted to clients.

As shown in FIG. 5, the charger chip is electrically coupled to the processing unit 510. The processing unit 510 can be an FPGA, ASIC, or CPU. The charger chip can communicate with the processing unit 510 to determine the complex conjugate of the beacon signals received at each antenna 535*a-n*. The processing unit 510 can instruct the phase shifter 530*a* to adjust the phase of a wireless power waveform signal that is sent to an antenna to enable the client device to receive a waveform in a particular phase.

The processing unit 510 can assist the AMUs in transmitting wireless power. The processing unit 510 can communicate with different client devices, manage timing/code synchronization between client devices and AMUs, manage power delivery allocation to different client devices, control power level beacon signals transmitted from a client device (e.g., determine that a beacon signal is weak and require the device to increase the power used to transmit its beacon signal), and manage handover of client devices from one transmitter to another transmitter.

In some implementations, each AMU can support phase detection and wireless power delivery for multiple client devices simultaneously through Time-Division Multiplexing (TDM). For example, time between two successive phase readings of a beacon signal range from 2 microseconds to 10 microseconds, which is controlled by the processing unit 510 through phase readings to update wireless signals.

Although the processing unit 510, the clock source 505, and the antennas 535*a-n* can be located off the charger chip (i.e., physically separated and integrated through traces), in alternative implementations, the processing unit 510, the clock source 505, and the antennas 535*a-n* can be located on the charger chip. For example, the antennas 535*a-n* could be integrated into the AMUs 515*a-n* for a monolithically integrated chip.

Also, the charger chip can include an on-chip temperature sensor to protect the charger chip from overheating or damage. For example, the processing unit 515 can send a notification to a user or implement a shutdown process if it determines the temperature of the charger chip has exceeded a certain temperature based on a signal from an on-chip temperature sensor.

In some implementations, the charger chip transmits RF-based wireless power to multiple client devices and receives beacon signals from multiple client devices. Additionally, in some implementations, the charger chip transmits RF-based wireless power to multiple receivers within a single client device. More details regarding transmitting wireless power to multiple clients or client devices with multiple receivers are disclosed in U.S. patent application Ser. No. 15/094,963, filed Apr. 8, 2016, titled "WIRELESS CHARGING WITH MULTIPLE POWER RECEIVING FACILITIES ON A WIRELESS DEVICE," which is hereby incorporated by reference in its entirety.

Figure 6:
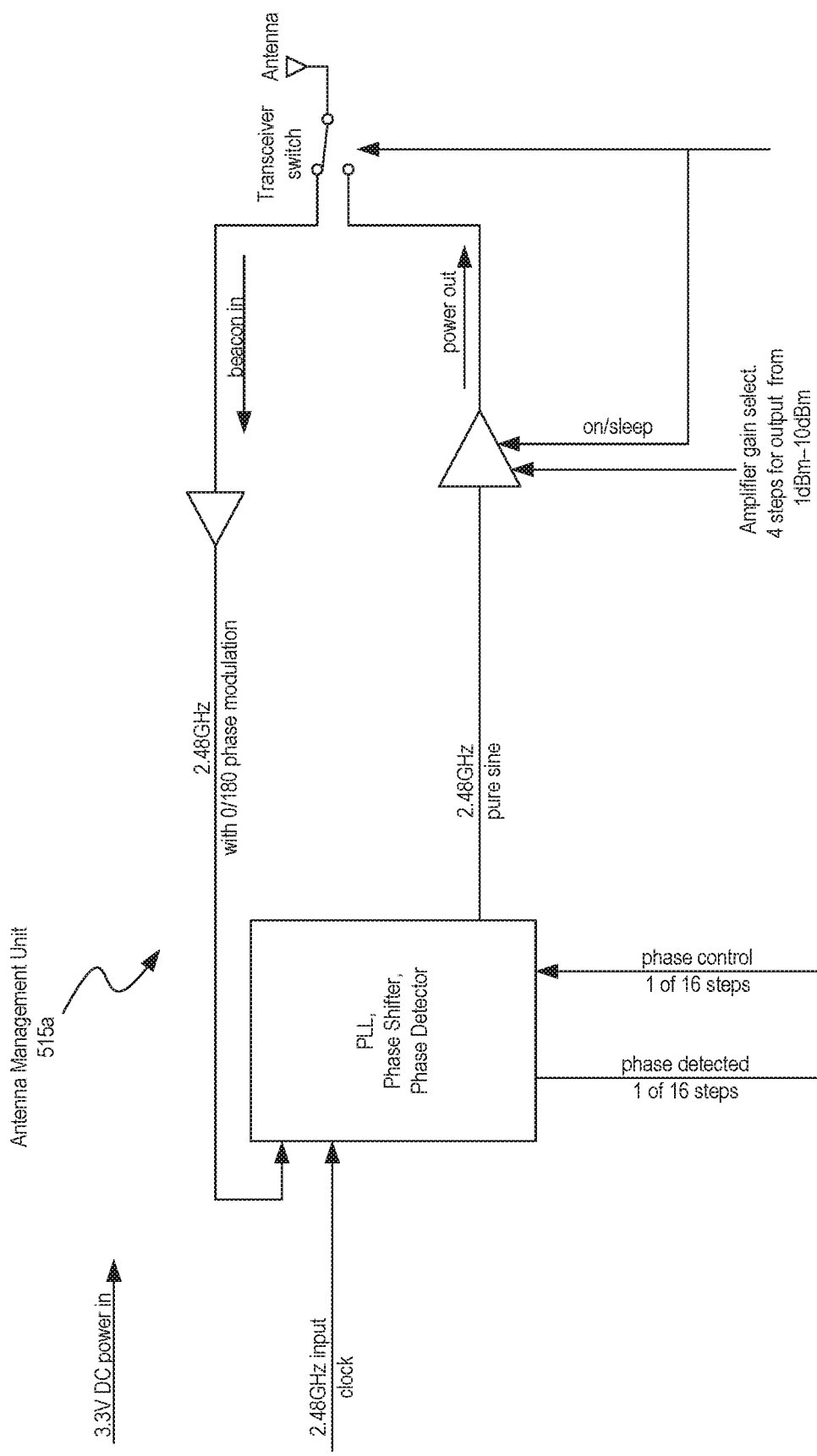
FIG. 6 is a schematic block diagram illustrating an antenna management unit (AMU) from FIG. 5 in more detail in accordance with implementations of the disclosed technology.

Moving to a more detailed description of the AMU 515*a-n*, FIG. 6 is a block diagram illustrating a schematic diagram of an AMU. FIG. 6 includes a phase-locked loop (PLL), phase shifter and phase detector block, and two power amplifiers (e.g., to increase the gain of received beacon signals), as well as a transceiver switch (e.g., to switch between receiving a beacon signal and sending a power signal), and an off-chip antenna. Although a PLL is shown in FIG. 6, a delay-locked loop (DLL) can used in lieu of the PLL. A nominal 3.3 or lower DC power can be used to power each AMU.

Figure 7:
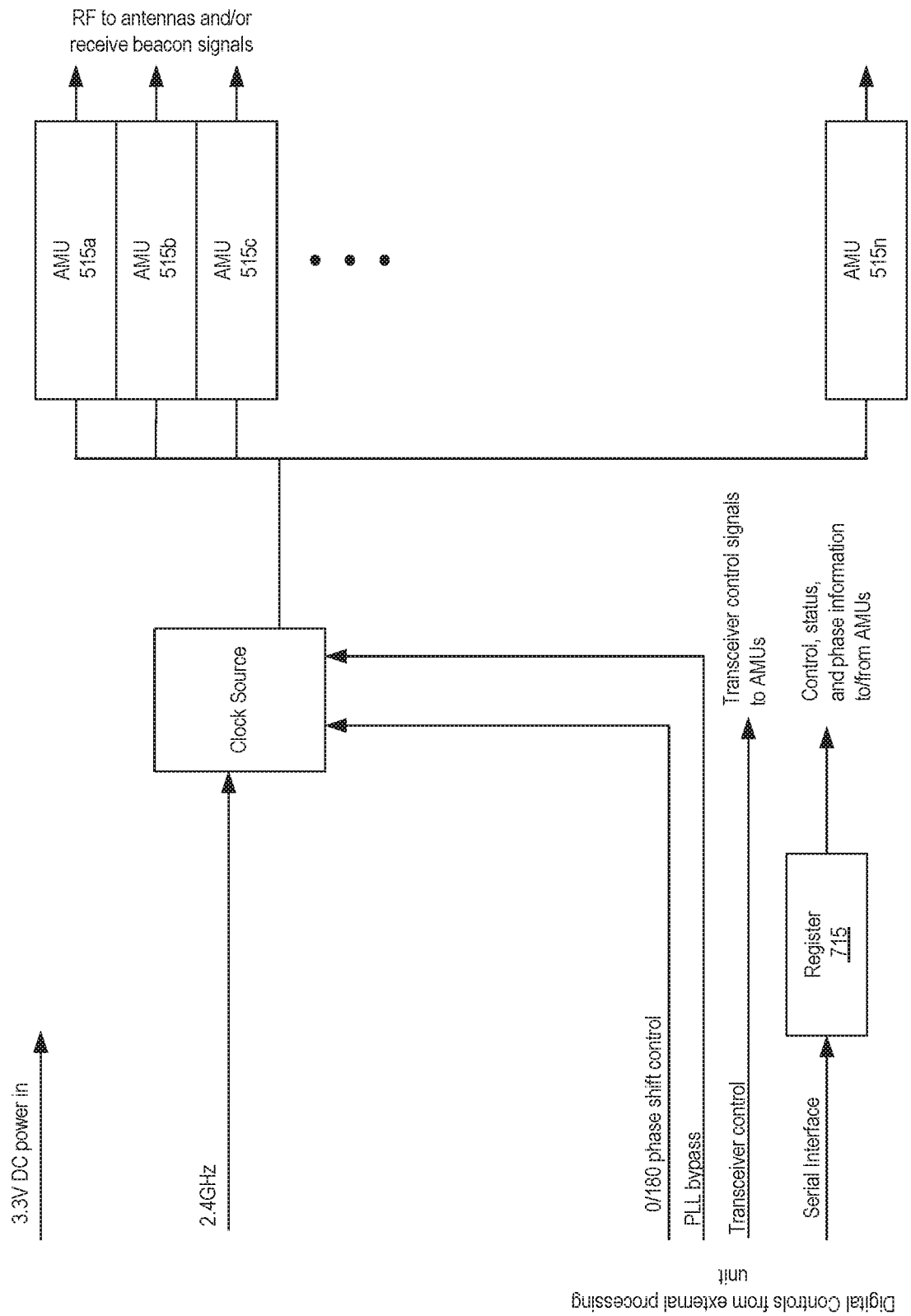
FIG. 7 is a schematic integrated circuit block diagram of multiple AMUs for transmitting wireless power and receiving signals from a client device in accordance with implementations of the disclosed technology.

FIG. 7 is an example integrated circuit charger chip with multiple AMUs for transmitting wireless power and receiving beacon signals. On the left side of FIG. 7, digital control signals can be received from a processing unit (e.g., an FPGA). The processing unit can instruct different AMUs 515*a-n* to transmit different wireless power signals. The processing unit can provide signals, can include information about the phase shift to be applied to a waveform (e.g., 0-180° shift, which may be used for modulation/coding), whether to bypass a phase-locked loop (PLL), the control signals for transceivers (e.g., to switch a transceiver from receive to transmit), and the serial interface signals (e.g., signals to the registers for the different transceivers and antennas). For example, the incoming signal can indicate to phase shift a particular power signal sent to a particular AMU (e.g., 515*a*), and the data can be stored in register 715. A clock source (e.g., 2.4 GHz) is used to synchronize signals going to the AMUs 515*a-n*.

Figure 8:
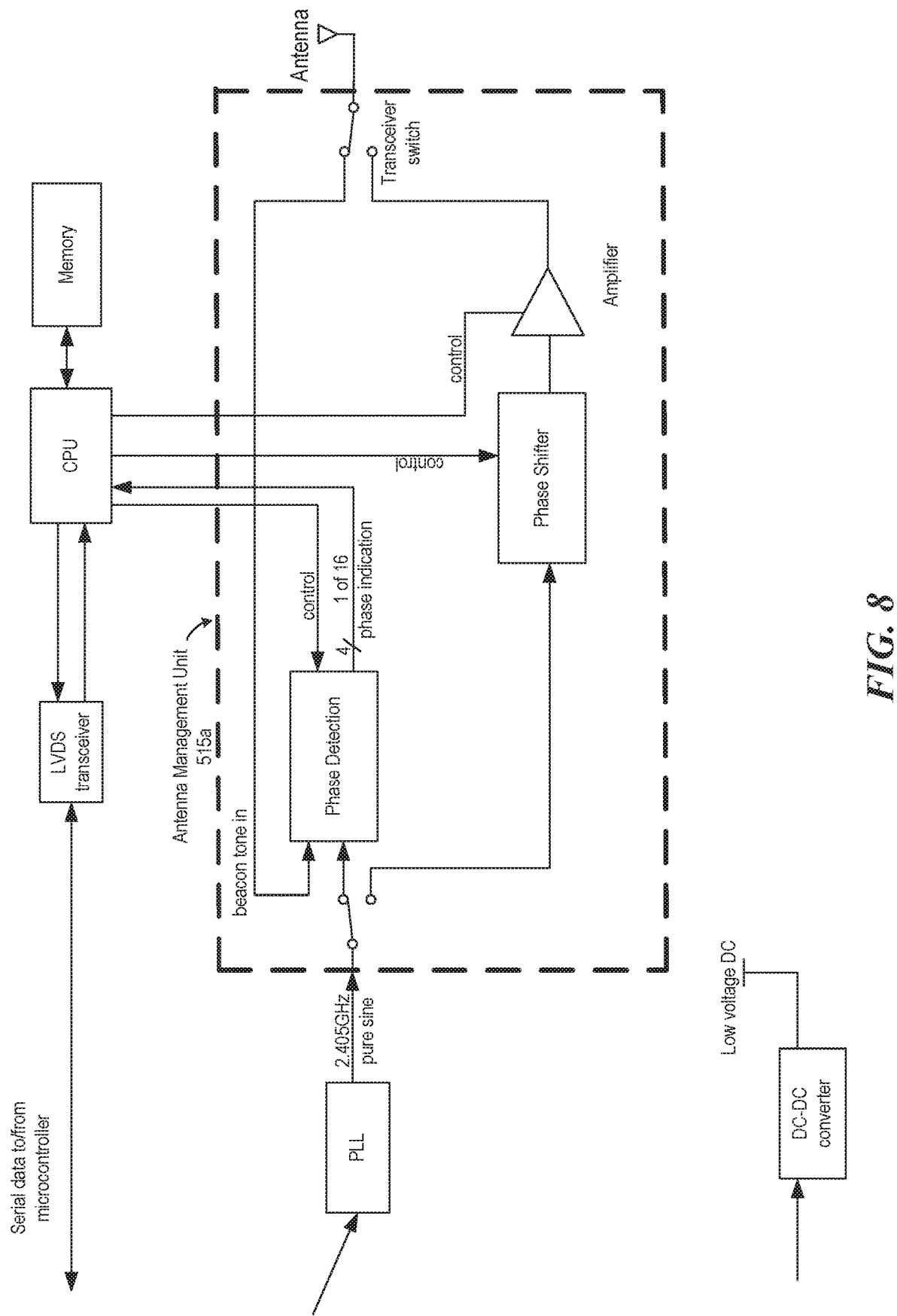
FIG. 8 is another schematic integrated circuit block diagram for transmitting wireless power and receiving signals from a client device in accordance with implementations of the disclosed technology.

FIG. 8 is another schematic of a charger chip. As shown in FIG. 8, an AMU 515*a* can be connected to a CPU coupled to memory. The CPU can communicate with a processing unit via a low-voltage differential signaling (LVDS) system (e.g., a TIA/EIA-644) over a serial data line. The processing unit can also be coupled to multiple antenna boards. Antenna boards are described in more detail in U.S. patent application Ser. No. 15/289,117 titled "ANTENNA CONFIGURATIONS FOR WIRELESS POWER AND COMMUNICATION, AND SUPPLEMENTAL VISUAL SIGNALS," filed on Oct. 7, 2016, which is incorporated by reference herein in its entirety.

In some implementations, each charger chip is connected to a DC-DC converter (as shown in FIG. 8), which can step down (e.g., decrease) the voltage supplied to each AMU. For example, the motherboard of a client device can supply 12V of power, but each charger chip with several AMUs may operate on 1.8 volts, so the DC-DC converter converts the 12V to 1.8V.

While not shown in FIG. 8, the charger chip can be part of a printed circuit board (PCB). The PCB can have several (e.g., 2-2000) charger chips each with several AMUs. For example, if a charger chip has four AMUs, it can drive and receive from four antennas. If there are 16 charger chips, then there can be 64 antennas on a single PCB. The processing unit can send instructions to each AMU on the charger chip. For example, a CPU can control the phase shifter, which changes the phase of the outgoing power signal to an antenna. The amplifier can increase (e.g., amplify) the signal strength. Also, the PLL can keep all the AMUs synchronized.

Figure 9:
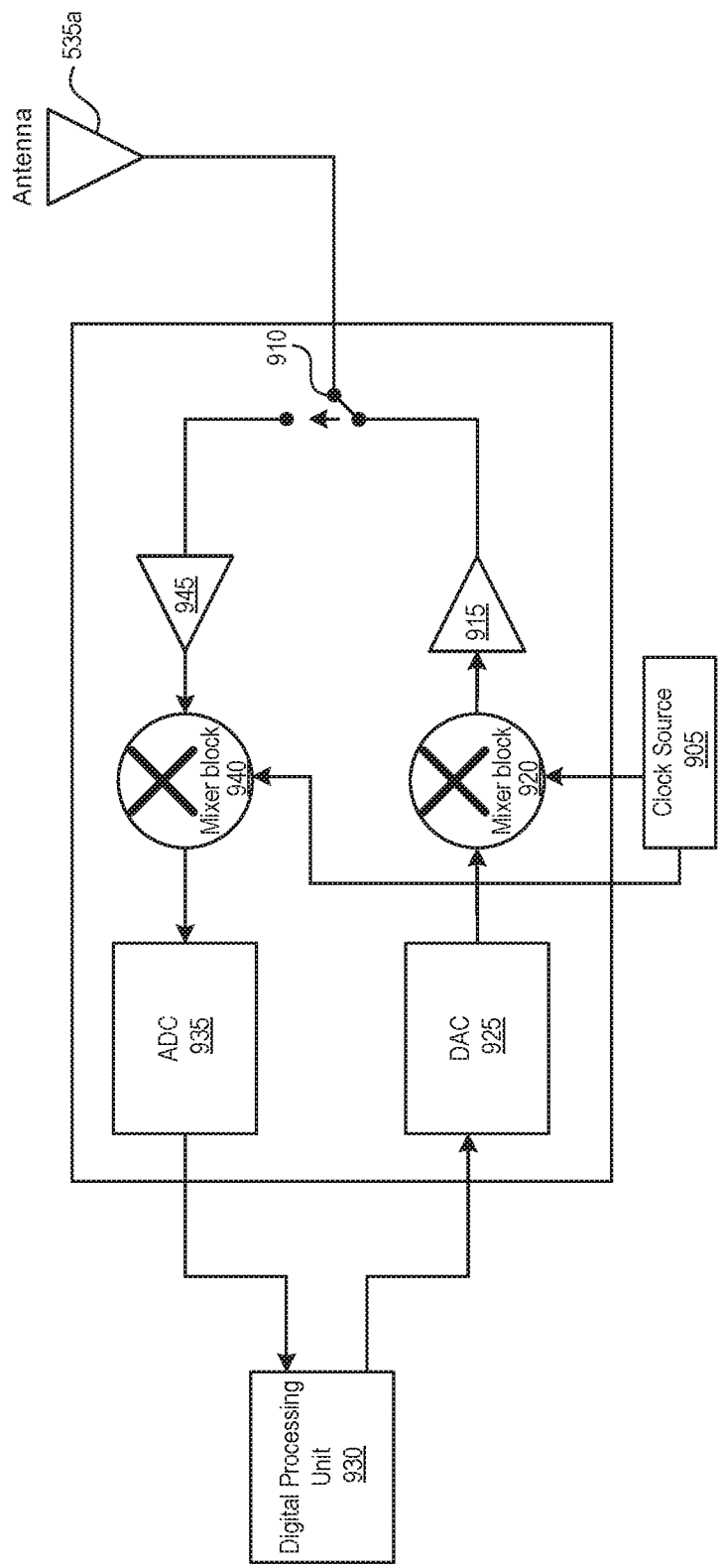
FIG. 9 is an alternative schematic integrated circuit block diagram for transmitting wireless power and receiving signals from a client device using an AMU in the digital domain integrated circuit.

FIG. 9 illustrates an alternative implementation of an AMU on a charger chip. In particular, FIG. 9 discloses an implementation of a charger chip that operates digitally as compared to in analog as described above in FIGS. 5-8. The transceiver switch 910 can be configured to switch an antenna from receiving a beacon signal to transmitting wireless power. If the transceiver switch 910 is set to receive, the received signal can be amplified in an amplifier 945 (e.g., a low noise amplifier) and with a mixer block 940 (e.g., converts a signal from one frequency to another or modulates/de-modulates a signal). Then the signal can be converted from an analog signal to a digital signal using an analog-to-digital converter (ADC) 935. After the conversion, the signal is sent to a digital processing unit 930 (e.g., to determine the phase or other information about the signal). The digital processing unit 930 determines whether to send a power signal to the client, and if so, how much power to send and the phase of the signal. That signal goes to a digital-to-analog (DAC) converter 925, into mixer block 920, into a power amplifier 915 to increase the strength signal, and then the transceiver switch 810 is switched to send the power signal to a client. A clock source 905 can synchronize the signals transmitted and received. In some implementations, operating the AMU in the digital domain reduces the charger chip footprint as compared to analog domain charger chip. Also, in some implementations, operating the AMU in the digital domain reduces power consumption compared to operating the AMU in the analog domain.

The charger chip can include additional features on the chip. In some implementations, each AMU on the charger chip includes a received signal strength indicator (RSSI) in a beacon detection path (e.g., coupled to the antenna port for antennas 535a). The RSSI reading helps to determine if the received beacon is below or above a threshold (e.g., a minimum power level). Based on the RSSI values, the charger chip can set or reset a flag-bit that indicates the quality of the beacon signal. More generally, RSSI threshold values are used to determine which antennas and AMUs to turn on or turn off to increase the efficiency of wireless power delivery. By using the RSSI threshold values the power consumption of the charger can be reduced, thereby increasing the efficiency of the charger.

Figure 10:
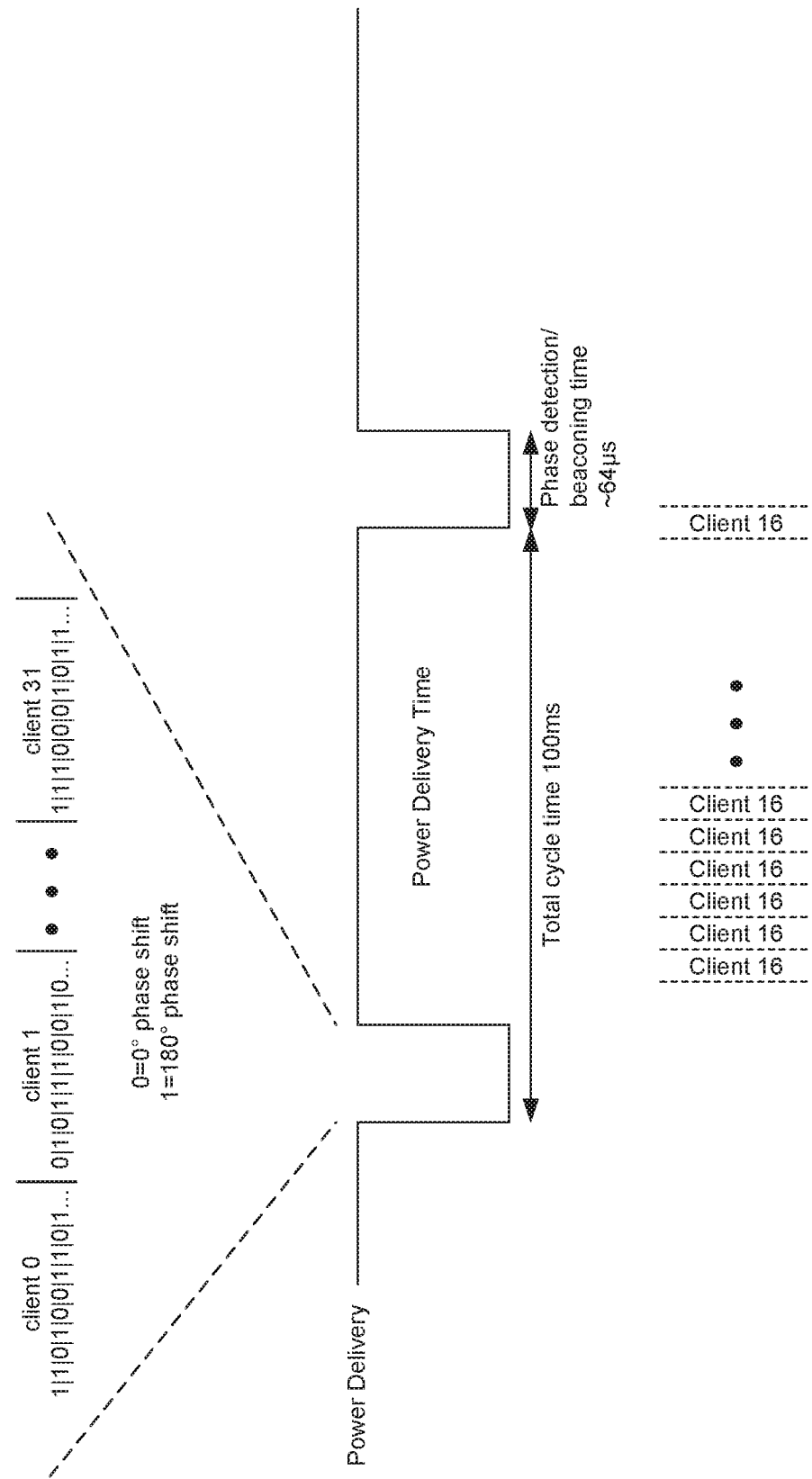
FIG. 10 is an illustration of a beacon timing and power delivery schedule for transmitting wireless power in accordance with implementations of the disclosed technology.

FIG. 10 is an example diagram of beacon timing and power delivery for a charger chip. In some implementations, beacon timing is divided into 32 time slots where each client sends a beacon in one time slot, and it is modulated with that client device's unique phase modulation code (e.g., 1101001101 . . . for client 0), using, e.g. BPSK, DPSK, QPSK, or other modulation schemes. Also, power delivery can be divided into time slots. For example, power is sent to one client during each time slot, a processing unit implements a schedule table (e.g., stored in memory) to control the time slot(s). As shown in FIG. 10, a total time cycle (between delivering power and phase detection from beacons) can be 100 ms, wherein phase detection is approximately 64 μs. More details regarding beacon timing and power delivery are disclosed in U.S. patent application Ser. No. 14/956,673, filed Dec. 2, 2015, titled "TECHNIQUES FOR ENCODING BEACON SIGNALS IN WIRELESS POWER DELIVERY ENVIRONMENTS," which is hereby incorporated by reference in its entirety.

Figure 11:
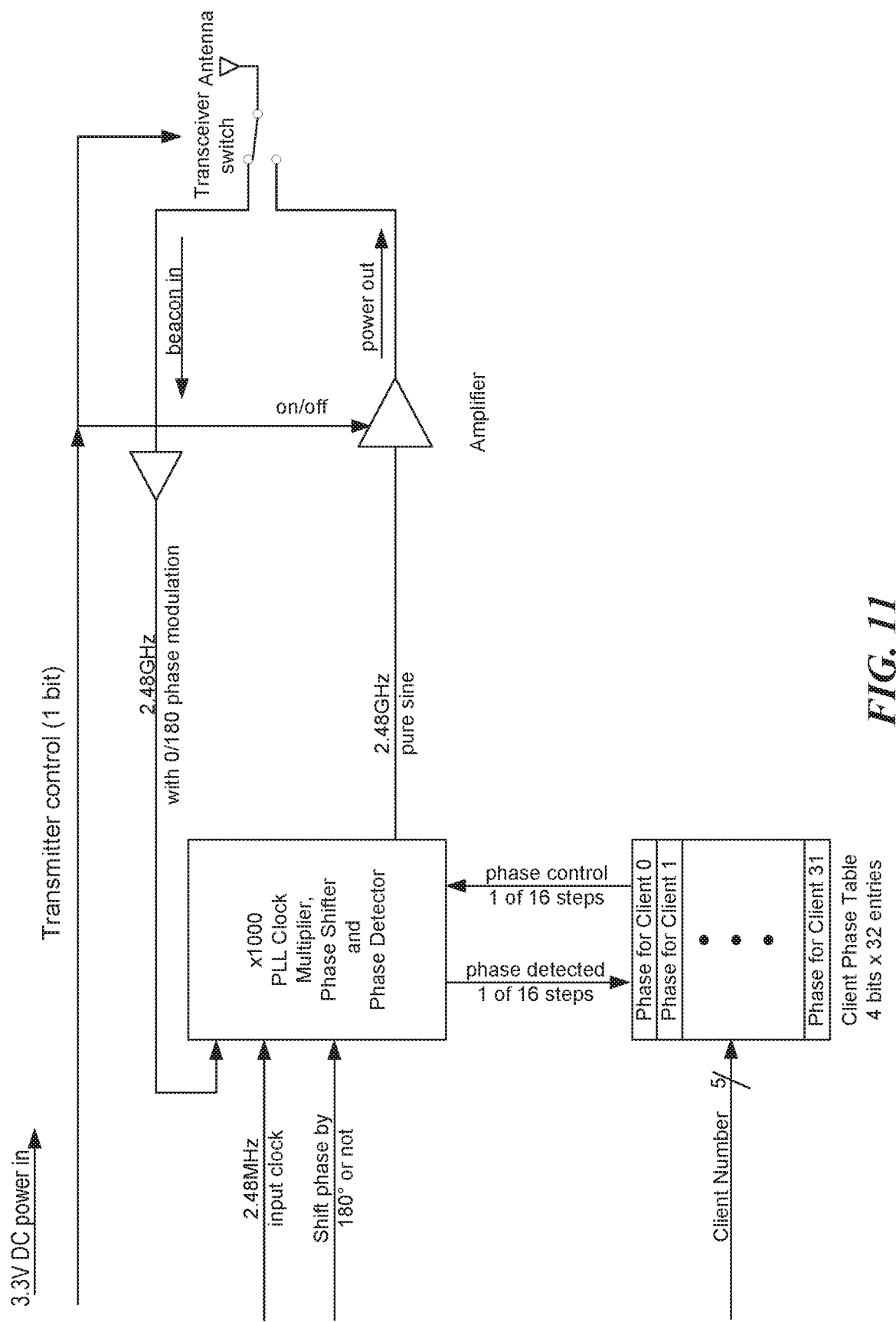
FIG. 11 is a schematic illustration of an AMU with a client device number and corresponding phase for a client device that can be used in transmitting wireless power to a client device in accordance with implementations of the disclosed technology.

FIG. 11 is an example of an AMU that receives a request to send power to a client device and receives the corresponding phase for a power signal to send to the client device. For example, a digital processing unit computes the phase table shown in FIG. 10 (e.g., the phase for sending power to client 0 or client 1), and in response the AMU uses a phase shifter, synchronization signal from a clock, and amplifier to send a power signal to a client with a corresponding phase. In some implementations, the AMU can dynamically assign different client devices to different transmitters in the same area. In some implementations, the client devices can send a beacon signal more than once—e.g., the phase-coding scheme allows for a possibility that all client devices send beacon signals in all time slots—with the transmitter deciding which client device it wants to phase-measure in each time slot.

Figure 12:
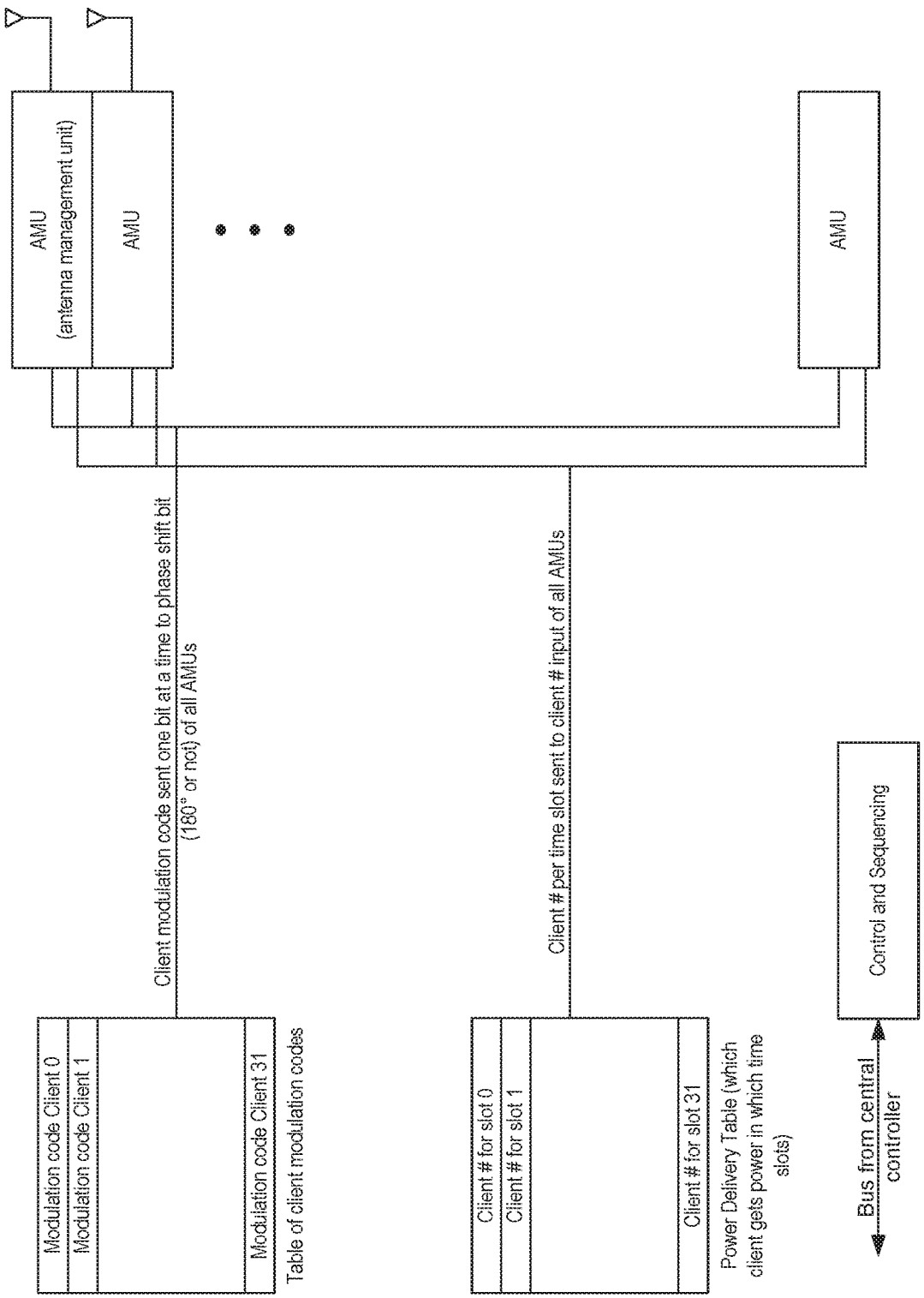
FIG. 12 is an example of a power delivery table for client devices from an AMU in accordance with implementations of the disclosed technology.

FIG. 12 is an example of a power delivery table for clients from an antenna management unit on a charger chip. As shown in FIG. 11, a charger chip can have a table of client modulation codes and a power delivery table. The tables allow a charger chip to know which client to power, when to power it, and how much power to transmit. In general, FIG. 12 shows how a signal can be modulated (e.g., table for client modulation codes) and how a client can be powered (e.g., power delivery table).

Client Chip Technology

As discussed in FIGS. 1-4, a client device can include a receiver that enables the client device to receive wireless power and transmit beacon signals. To receive wireless power and transmit beacon signals, the receiver can include an IC (also referred to as the "client chip"). In some implementations, the client chip can receive, rectify, and convert RF wireless power into DC voltage/current. The client chip can use the DC voltage/current to power the client device physically coupled to the client chip, or it can use the voltage/current to store power in a battery physically coupled to the client device. The client chip can also transmit a beacon signal to the wireless transmitter (transmitter 101 in FIG. 1).

In some implementations, the client chip communicates with the client device to customize power delivery. For example, the client chip stores the client device's power management protocol in memory on the client chip and delivers power according to client device's power management protocol. In other implementations, the client chip can directly power a battery or component of the client device without using the client device's power management integrated circuit (PMIC). Additionally, in some implementations, the client chip sends power directly to the client device PMIC.

The client chip can be composed of semiconductor material, such as Silicon, GaAs, Silicon on an insulator (SOI), or GaN. Manufacturers can fabricate the client chip using semiconductor material and processing methods such as doping, ion implantation, etching, deposition of various materials, photolithographic patterning, dicing, and/or packaging. In some implementations, the client chip is an ASIC. One or more ASIC client chips can be integrated into the receiver 103 shown in FIG. 1.

In some implementations, the client chip operates in ISM frequency bands such as 2.4 to 2.483 GHz or 5.725 to 5.875 GHz. The client chip can also operate at other ISM frequencies such as 24.00 GHz or frequencies suitable for wireless power transmission.

In addition to receiving wireless power, the client chip can communicate with other integrated on the device client for supplementary functionality. For example, antennas can be configured to communicate using a wireless standard (e.g., WiFi, IEEE 802.11, ZigBee™, Bluetooth™) and transmit beacon signals. In some implementations, the client chip can use an antenna to communicate via Bluetooth™, WiFi, ZigBee™, or other wireless communication protocols. In general, instructions for communicating or transmitting beacon signals can be stored in memory, and these instructions can be executed by the CPU.

Figure 13A:
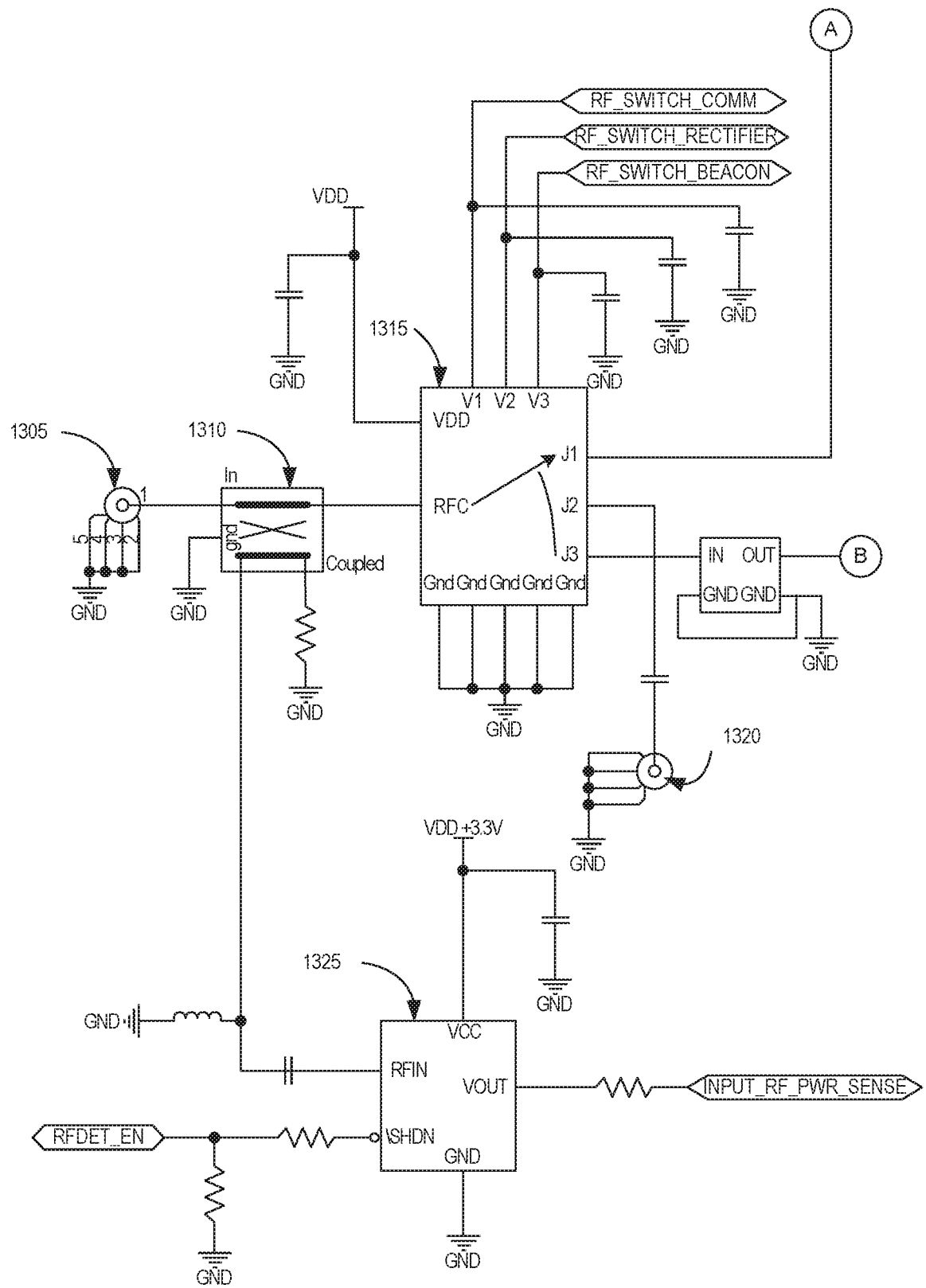
FIGS. 13A-C collectively are a schematic integrated circuit block diagram for a receiver that can be used for receiving wireless power at a client device in accordance with implementations of the disclosed technology.
Figure 13B:
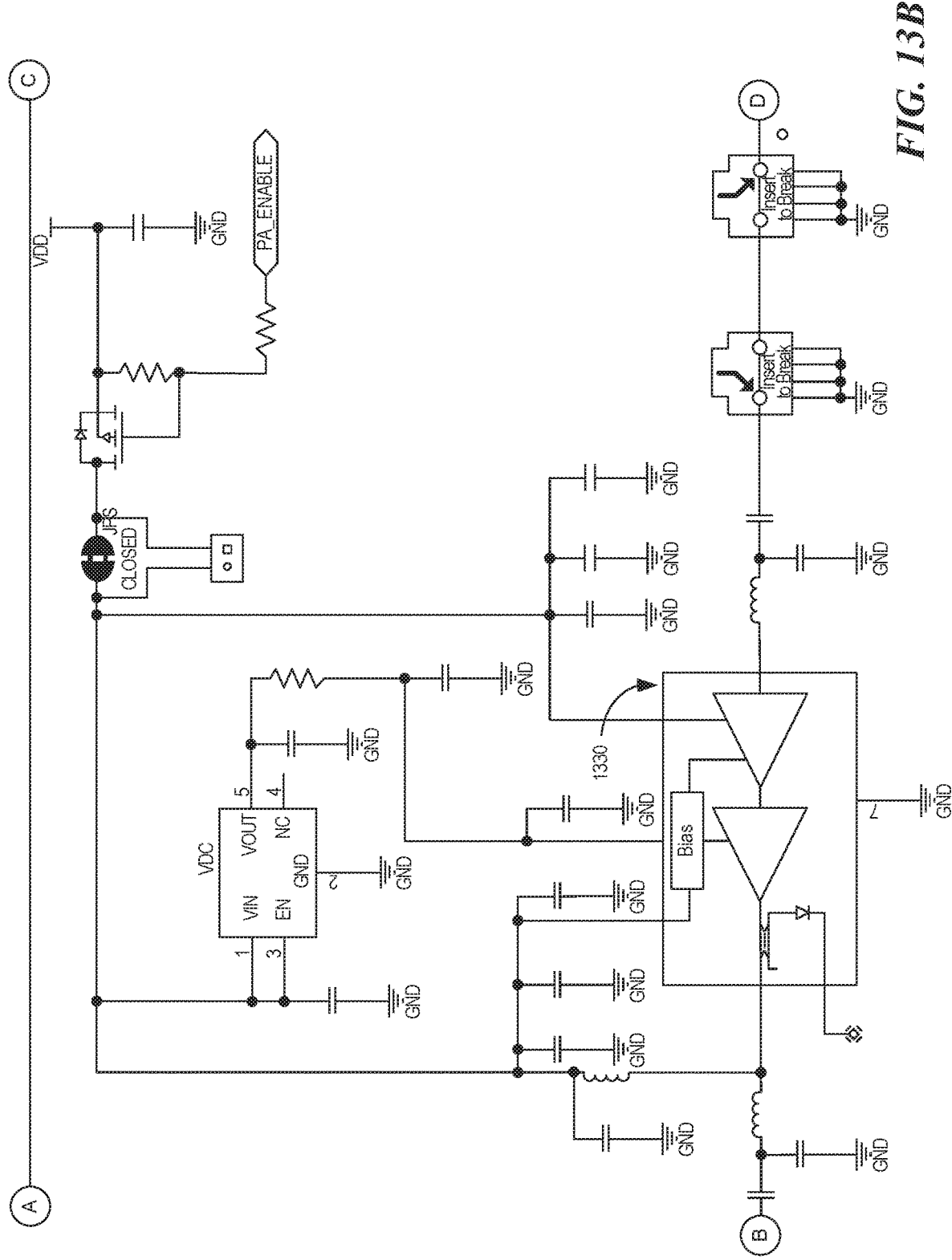
Figure 13C:
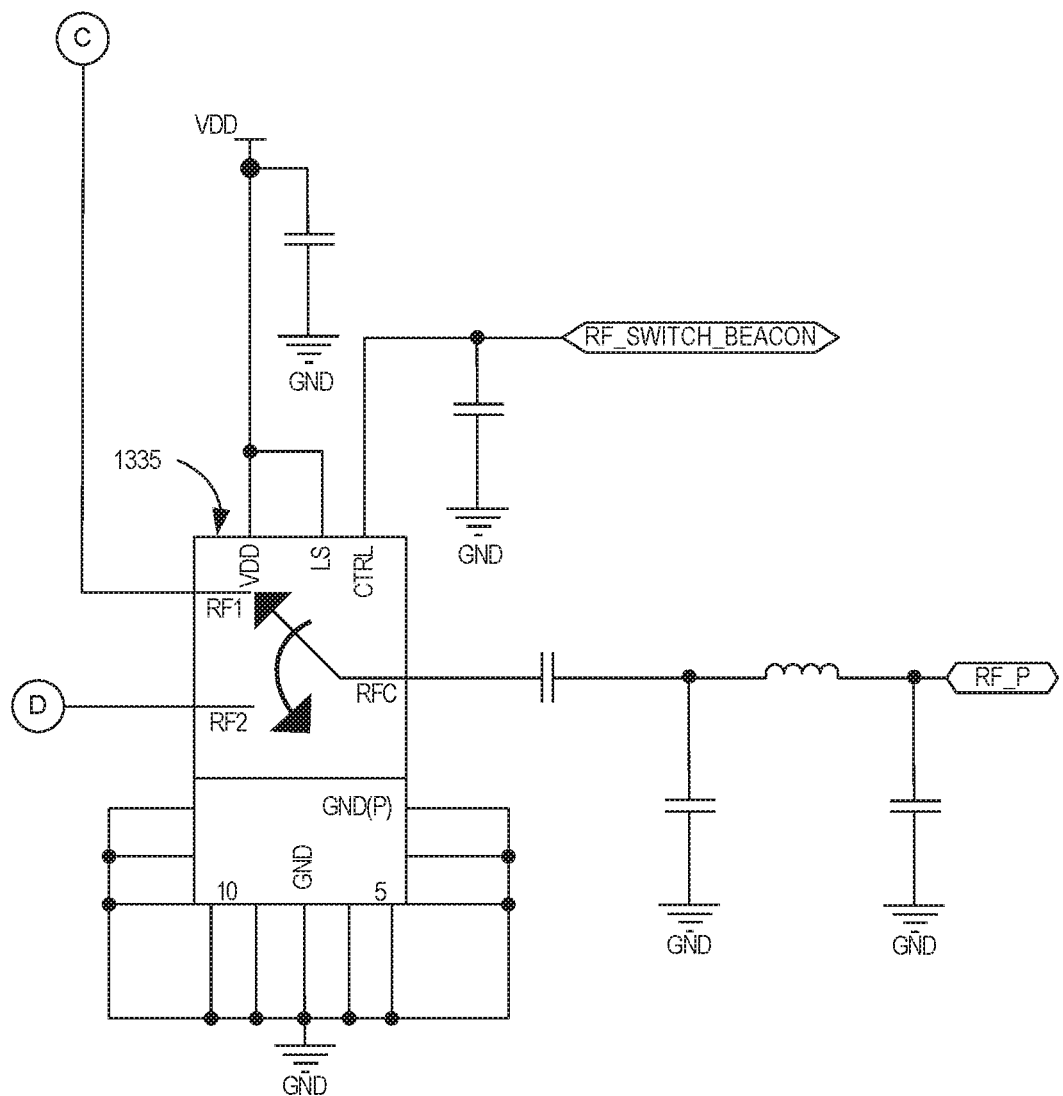

Moving to FIGS. 13A-13C, the Figures together show an example schematic diagram of a circuit for the wireless power receiver. The schematic diagram is spread over FIGS. 13A, 13B, and 13C as shown with connecting points "A" and "B" in FIG. 13A; "A," "B," "C," and "D" in FIG. 13B; and "C" and "D" in FIG. 13C. As a broad overview, the circuit includes elements such as capacitors, op-amps, inductors, lead wires, and grounds. These components can be varied to meet design specifications. For example, some capacitors can have a capacitance of 1 microfarad or 1 picofarad, and inductors can have inductance of 1 millihenry. Voltages in the circuit can be 0 to 5 volts (or more) with a typical 3.3 volts to open a gate to send a beacon signal. Resistors can have 20 to 200 Ohms (or more) resistance ratings. But overall, actual values of components shown in FIGS. 13A-13C depend upon the implementation details and design constraints.

Starting on the left side of FIG. 13A, an antenna 1305 receives wireless power or data. Although one antenna is shown in FIG. 13A, several antennas can be included in the circuit, where the antennas would be connected to similar components as the antenna 1305. Once the antenna 1305 receives power, the wireless power moves to sensing unit 1310. Sensing unit 1310 senses if an antenna is receiving power. A sensing unit 1310 can be a directional coupler or other RF detector (also referred to as a "detection unit"). As shown in FIG. 13A, an input unit 1325 is connected or coupled to the sensing unit 1310. The input unit 1325 may be simple logic or circuitry configured to send information regarding the received wireless power to another part of the system such as the CPU.

Regarding sensing information for wireless power, the sensing unit 1310 receives a small portion of the wireless power and notifies the wireless device that power has been received. The CPU in the wireless device can use the sensed wireless power information to determine which antennas are receiving power and how much power is received. In some embodiments, the CPU can store this data in memory and send it to a transmitter, database, or cloud storage device for further analysis (e.g., to determine which antennas are generally better for receiving power). As a sample use of sense information, the transmitter can determine which transmitting antennas are efficiently sending power to which receiving antennas based on sense information, and the transmitter CPU can use this information to optimize the transmission of wireless power. In some implementations, a processing unit on the client device can receive sensed power information and use it to increase (e.g., optimize) the amount of power received at the client device. For example, a client device can store instructions in memory that when executed by a processor cause the client device to only receive wireless power from antennas that are receiving wireless power above a threshold (e.g., a minimum voltage). In such an example, the client device can shut down antennas that are receiving power below a threshold or dedicate these antennas below a threshold to transmitting beacon signals. As another example, the processor can execute an algorithm that determines which antennas are receiving more power than other antennas (e.g., ranking algorithms), and use this algorithm to increase (e.g., optimize) the amount of power received by deactivating some antennas or dedicating some antennas to transmitting a beacon signal. The processor can send control signals to active, deactivate, or switch an antenna from beacon signaling to transmitting power.

After sensing that RF power is received at antenna 1305, the circuit in FIG. 13A determines a path for the power. As shown in FIG. 13A, switching unit 1315 can switch the antenna from a communication or beacon mode to rectifying mode by applying a voltage to the switching unit 1315 ("RF_switch_RECTIFIER," "V2"). As V2 is applied to the switching unit 1315, the power is directed towards "J2" where it enters an RF rectifier 1320. A switching unit 1315 can be referred to as a control unit and it can be implemented in an integrated circuit or on an ASIC. The RF rectifier 1320 converts the RF power to DC, and the DC power can directly enter a battery.

Also, the circuit in FIGS. 13A-C can use antenna 1305 to communicate or send the beacon signal. As shown in FIG. 13A, if voltage (e.g., V1 by "RF SWITCH COMM") is applied to switching unit 1315, the circuit can communicate using a known signal type (e.g., WiFi, Bluetooth™, ZigBee™). The "A" point on FIG. 13A shows where communication signals are transmitted and received. Additionally, if voltage (e.g., V3) is applied to switching unit 1315, the beacon signal can transmitted from antenna 1305 as described in more detail below with respect to FIG. 13C.

Moving to FIG. 13B, the circuit can send communication from point "A" to point "C". Although not shown in FIG. 13B, point "C" is connected to an integrated circuit for communication such as communicate via Bluetooth™, WiFi, ZigBee™, or other wireless communication protocols. Before the signal is sent to the respective communication chip, a filter can remove the data from the wireless power signal.

Staying with FIG. 13B, a central control unit (e.g., a processor) can send a pulse and amplitude enabling signal ("PA_Enable") to enable a beacon signaling sequence. Once the "CLOSED" portion of circuit 13B opens (as shown in the middle-upper portion of FIG. 13B), a voltage reaches two op-amps 730. The two-op amps 1330 amplify the beacon signal coming from "D". A CPU or ASIC can generate the beacon signal that comes from "D". After the beacon signal is amplified, antenna 1305 transmits it.

As shown in FIG. 13C, another switch 1335 can active the beacon signaling path shown in FIG. 13C. A CPU can send a "RF Switch Beacon" signal into switch 1335, and switch 1335 can flip and cause "RF_P" to enter the circuit. "RF_P" can be a pulse with a beacon signal.

Overall, FIGS. 13A-13C describe a general integrated circuit schematic for using an antenna to receive power, communicate information, and transmit a beacon signal. As disclosed below, FIGS. 14, 15, 16, and 17 describe specific implementations of the integrated circuit described in FIGS.

Figure 14:
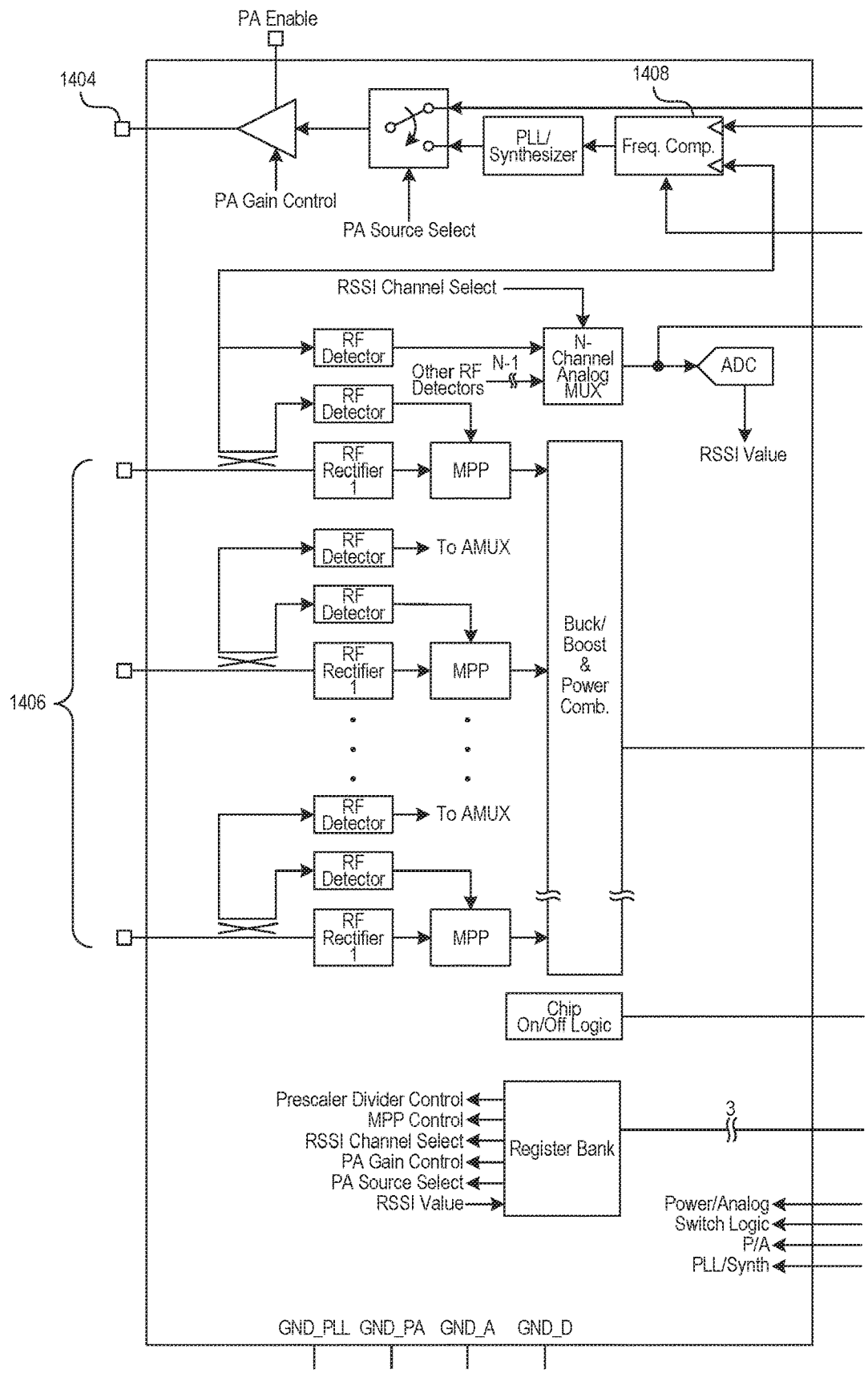
FIG. 14 is another schematic integrated circuit block diagram for a receiver that can be used for receiving wireless power at a client device in accordance with implementations of the disclosed technology.
Figure 15:
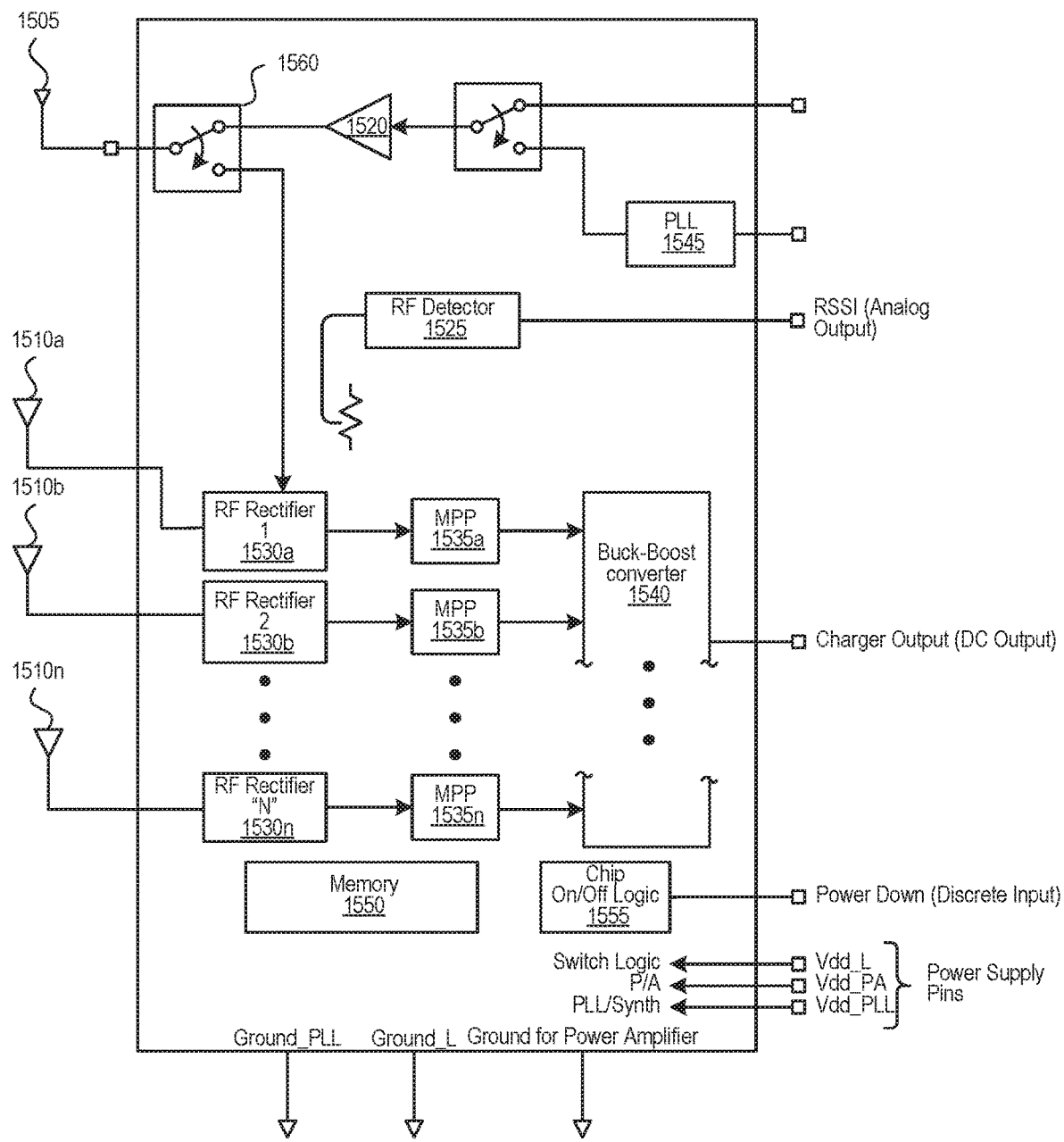
FIG. 15 is yet another schematic integrated circuit block diagram for a receiver that can be used for receiving wireless power at a client device in accordance with implementations of the disclosed technology.
Figure 16:
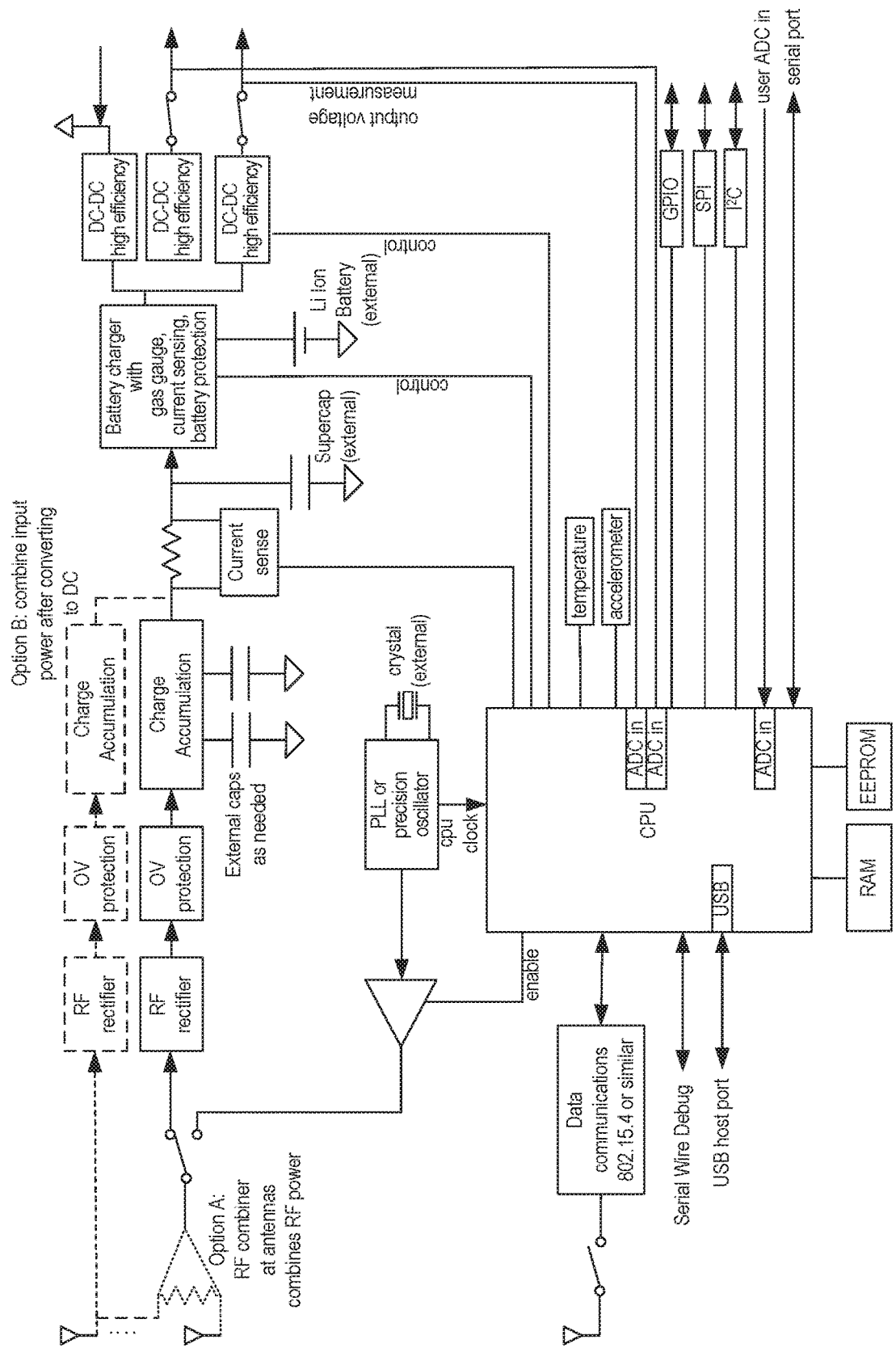
FIG. 16 is a schematic integrated circuit block diagram for a receiver used to for receive wireless power at the client device, where the receiver is connected to a central processing unit in the client device in accordance with implementations of the disclosed technology.
Figure 17:
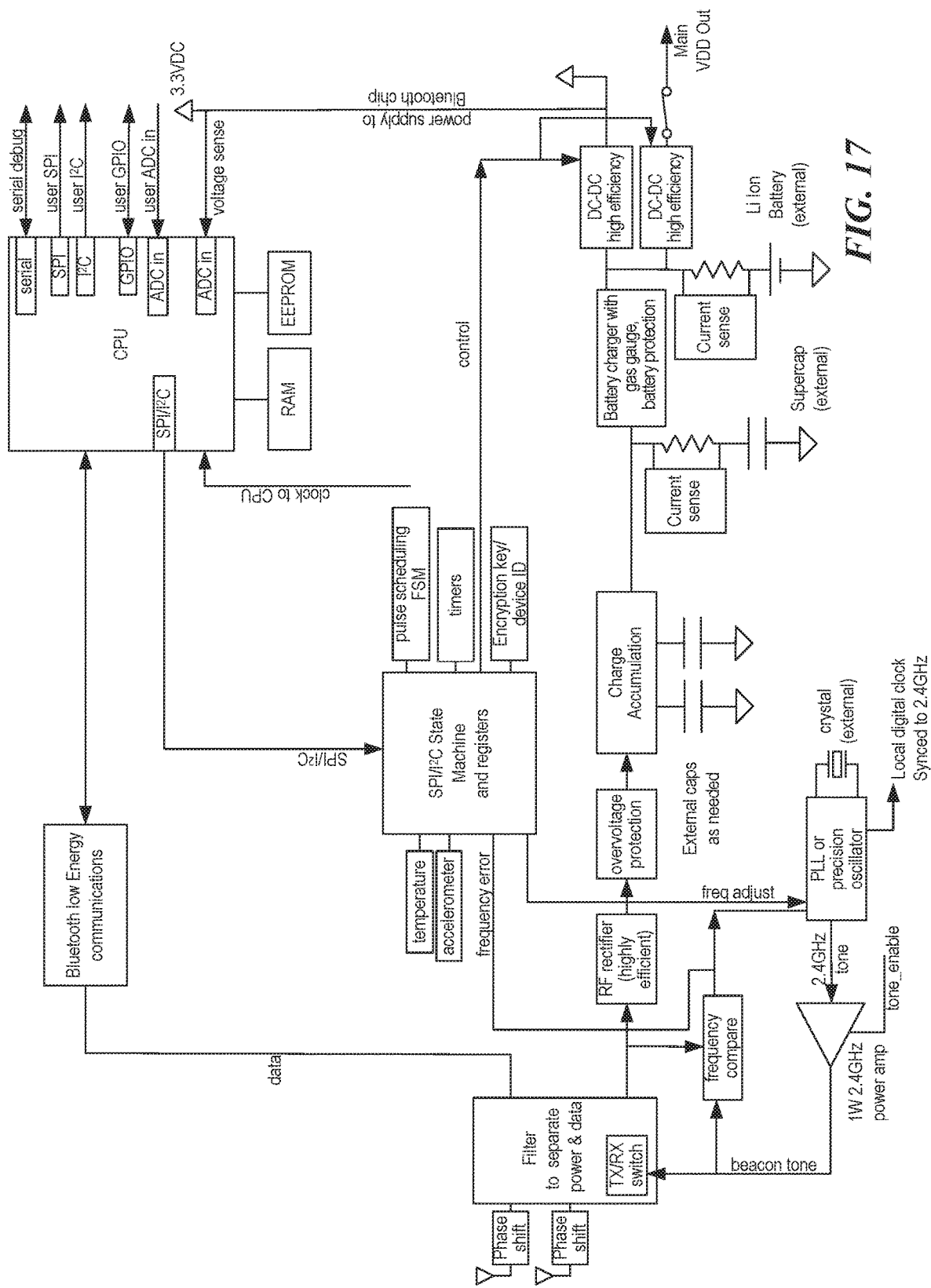
FIG. 17 is a schematic integrated circuit block diagram for a receiver to receive wireless power at a client device, where the receiver is connected to a wireless communication circuit in the client device in accordance with implementations of the disclosed technology.

13A-13C with various embodiments. Specifically, FIGS. 14 and 15 are block diagrams of an ASIC for receiving wireless power. FIGS. 16 and 17 disclose an ASIC that is electrically coupled to a CPU in a wireless device.

FIG. 14 is an example of a block diagram illustrating a client chip used in a client device for receiving wireless power, transmitting beacon signals, or transmitting communication signals. The client chip can include: "N" RF detectors (where "N" is a natural number, e.g., 4), "N" RF rectifiers, an MPP (maximum power point tracking "MPPT", also referred to as the "MPP") for each "N" RF rectifier, an N-channel analog multiplexer (MUX), a buck-boost converter, an analog to digital converter (ADC), antenna 1404 for sending beacon signals, "N" antenna inputs 1406 for receiving wireless power, a register bank, ground connections, a frequency comparer 1408, and input/output connections. As illustrated, an RF rectifier can be coupled to an MPP loop to optimize power delivery. For example, the MPPT loop can communicate with a buck-boost converter to provide the client with constant voltage/current in an efficient manner. Additionally, as shown in FIG. 14, one antenna can be transmitting a beacon signal as another antenna concurrently receives RF power. Also, while not illustrated in FIG. 14, a client device can receive a sensed RF value from an RF detector and based on the received RF power being low (e.g., less than 0.02 watts), the client device (e.g., using a CPU) can switch the antenna off (e.g., with a switch connected to the antenna).

Also, the client chip receives a strength signal indicator (RSSI, or other similar signal) via the received signal and ADC. The RSSI can serve multiple purposes such as identifying clients that are not receiving enough power to rectify a significant amount of DC, or identifying clients who are receiving a very high power and should probably have their duty cycle reduced. In general, the RF detector, MPP, N-MUX, ADC, and RSSI components communicate with the CPU of a client device (not shown) to determine how to increase (e.g., optimize) power received by the client chip.

Although a buck-boost converter is shown in FIG. 14, other converters, such as a flyback converter can be used to optimize the power delivery. Also, although the client chip is physically coupled to "N" number of antennas, and more antennas generally means the chip can receive more power, the number of antenna ports may be reduced to lower cost of chip design (e.g., optimize). Also, to optimize power delivery to the client device, short traces can be used and the number of resistors can be limited to lower the loss of power (e.g., improve efficiency). Additionally, antennas should be placed close to RF rectifiers to reduce impedance. Also, if all antennas emit the beacon signal then spacing can vary between antennas because the transmitter can detect the beacon signal from all antennas and send power back to all antennas. Alternatively, if only one antenna emits the beacon, the other antennas can be within ¼ wave length (~3 cm) of the beacon emitting signal.

Also, FIG. 14 includes a register bank. The register bank can store values such as a received RSSI value, MPP value, RSSI channel select, PA gain control, PA source select, and prescaler divider control. These values can be saved in the register and can used by a processor. Additionally, a processor can access the register bank and send the stored values to another device or network.

Similar to FIG. 14, FIG. 15 is another example block diagram illustrating a schematic of a client chip. The client chip receives, rectifies, and converts RF power into DC voltage/current. The client chip can use the DC voltage/current received from a client chip to power the client, or it can use the DC voltage/current to store power in a battery. Also, a client chip can couple to a single antenna 1505 (e.g., to transmit the beacon signal), and couple to multiple antennas 1510*a-n* (e.g., four antennas to receive power). The client chip includes an RF rectifier 1530*a-n* for each antenna, a maximum power point tracking (MPPT, or also referred to as the "MPP") 1535*a-n* loop, a buck-boost converter 1540, a transceiver switch 1560, an RF detector 1525, a PLL 1545, and a memory 1550. In general, multiple client chips can be placed in a single wireless device as shown in FIG. 1.

In some implementations, the client chip transmits a beacon signal, and the beacon signal includes information used to compute the location of the client, as described above in FIG. 1. The client chip can transmit beacon signaling to the wireless charger (e.g., in wireless charger 101 in FIG. 1) using an RF signal input, PLL 1545, power amplifier 1520, transceiver switch 1560, and antenna 1505. The beacon signal encoding process and algorithm may be as described in the applicant's U.S. application Ser. No. 14/956,673, filed Dec. 2, 2015, titled TECHNIQUES FOR ENCODING BEACON SIGNALS IN WIRELESS POWER DELIVERY ENVIRONMENTS, which is hereby incorporated by reference in its entirety.

In some implementations, the memory 1550 on the client chip stores the power management policy for the client device (e.g., the PMIC instructions). In these implementations, the client chip can supply power directly to the client device (e.g., in the battery or into the client device's system). Alternatively, a client device may have a proprietary PMIC, and the client chip may be coupled to the PMIC. In these implementations, the client chip supplies power according to the specification provided by the manufacturer of the PMIC, and the client's PMIC handles the management of this power (e.g., pins and traces can be used to allow the client chip and PMIC to communicate and transfer power).

Although not shown in FIG. 14 or 15, the client chip can support a wide range of applications with different power requirements starting from several hundred milli-watts (mW) up to several watts of power. Also, the client chip can include an on-chip temperature sensor to protect the chip from overheating or damage.

Moving to FIG. 16, FIG. 16 is an example of a power receiving client. As shown in solid lines, RF signals combine right after being received by antennas and then the power is rectified. The efficiency of this alternative can depend on if there is constructive or deconstructive interference when combining RF power after the antennas receive power signals. Another option, as shown with broken lines, RF signals are combined after the power is rectified. The receiver can employ one of two ways to achieve parallel combination: either by combining the signals at RF in the front end of the client or by combining the signals at DC after conversion. FIG. 10 also includes a data communications unit (bottom left), which can be used to communicate with a network or transmitter over WiFi or Bluetooth™.

FIG. 17 is another, similar example of a power receiving client with other client technology. This example is different than the examples above because, in part, this client includes a Bluetooth™ chip. As shown in FIG. 17, the client can have antennas that receive power and data (e.g., Bluetooth™ data). In some implementations, the power and data signals can be at the same frequency, and the antennas of the client may pick up both a power signal and a data signal. In order to separate these signals, as shown in FIG. 17, the client can include a filter to separate power from data even if the signal is the same frequency. After the signal is filtered, power can be sent to the RF rectifier and converted to DC power. Additionally, a client can communicate via Bluetooth™, WiFi, ZigBee™, or other wireless communication protocols In some implementations, a data power filter may be used to separate the signals. Methods and systems for separating or filtering these types of signals is described in the applicant's U.S. patent application Ser. No. 14/926,014, filed Oct. 29, 2015, titled "TECHNIQUES FOR FILTERING MULTI-COMPONENT SIGNALS," which is hereby incorporated by reference in its entirety. Data signals can be sent to the Bluetooth™ chip for appropriate transmission. Similar to other examples of chips and clients described above, this client can use one or more channels in parallel to receive RF power and convert it into DC using the MPPT algorithm for optimization. In some implementations, DC power can be used to charge a battery on the client device. This client is also capable of sending a beacon signal at 2.4 GHz because it has a PLL/Frequency Synthesizer and power amplifier integrated into it, which can be used to send a beacon with the client's location to a wireless charger. The frequency of operation is not limited to just the 2.4 GHz but can also operate in other ISM frequency bands or frequency bands outside of ISM.

Also, although not shown in FIG. 17, WiFi technology can be used in a similar method described in the example above. For example, if a client has a WiFi chip and a client chip, a filter can be used on the client chip to separate the data signal from the power signal even if the signals are sent at the same frequency.

In addition to the components disclosed in FIGS. 13A-13C and FIGS. 14-17 for the client chip, the client chip can include additional features such as a cold start. A cold start can be software stored on the client chip or stored on the client device that enables the client device to operate in low power mode until RF power is available to bring-up the receiver again autonomously. For example, when the battery for a client device is dead, the client chip can enter a cold start mode until the battery has enough power to power the client device.

Conclusion

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description of embodiments of the disclosure is not intended to be exhaustive or to limit the teachings to the precise form disclosed above. While specific embodiments of, and examples for, the disclosure are described above for illustrative purposes, various equivalent modifications are possible within the scope of the disclosure, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are, at times, shown as being performed in a series, these processes or blocks may instead be performed in parallel, or may be performed at different times. Further, any specific numbers noted herein are only examples: alternative implementations may employ differing values or ranges.

The teachings of the disclosure provided herein can be applied to other systems, not necessarily the system described above. The elements and acts of the various embodiments described above can be combined to provide further embodiments.

These and other changes can be made to the disclosure in light of the above Detailed Description. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

While certain aspects of the disclosure are presented below in certain claim forms, the inventors contemplate the various aspects of the disclosure in any number of claim forms. For example, while only one aspect of the disclosure is recited as a means-plus-function claim under 35 U.S.C. § 112, 16, other aspects may likewise be embodied as a means-plus-function claim, or in other forms, such as being embodied in a computer-readable medium. (Any claims intended to be treated under 35 U.S.C. § 112, 6 will begin with the words "means for".) Accordingly, the applicant reserves the right to add additional claims after filing the application to pursue such additional claim forms for other aspects of the disclosure.

We claim:

1. An integrated circuit configured to receive radio frequency (RF) wireless power, the integrated circuit comprising:

multiple antenna ports configured to receive RF wireless power,
wherein at least one of the multiple antenna ports is further configured to:
receive a beacon schedule from a wireless power transmitter (WPT) for beacon broadcasting and RF power delivery to and from the WPT; and
transmit a beacon signal to the WPT according to the beacon schedule, and wherein the WPT is configured to transmit RF wireless power using multiple open paths from the WPT to the integrated circuit;
a beacon signal unit configured to transmit the beacon signal to the WPT to thereby permit the WPT to determine an identity and location of the integrated circuit,
   wherein the beacon signal unit is configured to transmit the beacon signal according to the beacon schedule, and
   wherein the beacon schedule is partially based on a time slot when the WPT is to send RF wireless power to the integrated circuit;
a detection unit, for each of the multiple antenna ports, configured to detect received RF wireless power;
a maximum power point tracking (MPPT) unit electronically coupled to the detection unit;
a rectifying unit, for each of the multiple antenna ports, configured to convert received RF wireless power to direct current (DC) power and to output the DC power to an external device or battery; and
a control unit configured to switch the integrated circuit between rectifying RF wireless power and transmitting the beacon signal,
   wherein the control unit is configured to send a predetermined voltage to a switch configured to cause at least one of the multiple antenna ports to switch from transmitting the beacon signal to receiving RF wireless power.

2. The integrated circuit of claim 1 further comprising:
a buck-boost converter or flyback converter unit,
   wherein the buck-boost converter or flyback converter unit is physically and electrically coupled to the MPPT unit,
   wherein the MPPT unit is configured to communicate with the buck-boost converter or flyback converter unit to cause the buck-boost converter or flyback converter unit to modify a charging voltage for a client device physically coupled to the integrated circuit, and
   wherein modifying the charging voltage is partially based on detected RF wireless power values.

3. The integrated circuit of claim 1 further comprising:
a temperature sensor physically coupled to the integrated circuit and configured to sense temperature information of the integrated circuit and send the sensed temperature information to a processor physically coupled to the integrated circuit,
   wherein the processor is configured to stop or partially prevent the integrated circuit from converting RF wireless power to DC power based on determining that the sensed temperature information exceeds a threshold value.

4. The integrated circuit of claim 1 further comprising:
a memory unit physically coupled to the integrated circuit,
   wherein the memory stores instructions for implementing a cold start algorithm,
   wherein the cold start algorithm enables a client device physically coupled to the integrated circuit to operate in a low power mode until an amount of power sufficient to autonomously bring-up the client device as determined based on operating power of the client device is available.

5. The integrated circuit of claim 1 further comprising:
a communication unit configured to filter data from received RF wireless power.

6. The integrated circuit of claim 1, wherein the integrated circuit is physically and electrically coupled to at least one of the following:
a ZigBee chip;
an 802.11abgn Wi-Fi chip; or
a Bluetooth communications chip.

7. The integrated circuit of claim 1, wherein the integrated circuit is incorporated into a:
smartphone,
laptop computer,
tablet computer,
display device,
battery,
wearable device, or
game controller.

8. The integrated circuit of claim 1, wherein the integrated circuit:
operates in a range of 2.4 to 2.48 GHz or 5.72 to 5.87 GHz; and
is configured to concurrently receive the RF wireless power and transmit the beacon signal.

9. The integrated circuit of claim 1, wherein the multiple antenna ports, detection unit, rectifying unit, beacon signal unit, and control unit are monolithically integrated.

10. The integrated circuit of claim 1, wherein the integrated circuit is directly coupled to a battery of a client device or physically and electrically coupled to a power management integrated circuit (PMIC) of the client device.

11. An apparatus for supplying power to a client device, the apparatus comprising:
multiple antenna ports, for connection to multiple antennas, and configured to receive wireless radio frequency (RF) power, and further configured to:
   receive a beacon schedule from a wireless power transmitter (WPT) for beacon broadcasting and RF power delivery to and from the WPT; and
   transmit, according to the beacon schedule, a beacon signal including a calibration signal to the WPT,
      wherein the calibration signal is received by the WPT configured to responsively provide a waveform for transmitting the wireless RF power to the client device using multiple, differing paths;
a detection circuit for each of the multiple antennas, configured to detect power wirelessly received from the WPT;
a rectifying circuit for each of the multiple antennas and configured to convert the received wireless RF power to direct current (DC) power;
a communication circuit configured to filter data from the received wireless RF power;
a beacon signal circuit configured to transmit the beacon signal to the WPT to thereby permit the WPT to determine an identity and location of the client device; and
a processor coupled to the detection circuit and the communication circuit.

12. The apparatus of claim 11 further comprising:
a power storage unit, coupled to the rectifying circuit, and receiving the DC power; and
a buck-boost converter or flyback converter circuit configured to electrically communicate with the power storage unit,
   wherein the buck-boost converter or the flyback converter circuit is electrically coupled to a maximum power point tracking (MPPT) circuit,
   wherein the MPPT circuit is configured to communicate with the buck-boost converter or the flyback converter circuit to cause the buck-boost converter or the flyback converter circuit to modify a charging voltage for the apparatus, and wherein modifying the charging voltage is partially based on detected wireless RF power values.

13. The apparatus of claim 11, wherein the processor receives detected power level information from the detection circuit and analyzes the information to determine which antennas of the multiple antennas are receiving wireless RF power, and wherein the apparatus further comprises a maximum power point (MPPT) tracking circuit electronically coupled to the detection unit.

14. The apparatus of claim 11 further comprising:
a memory unit configured to store strength signal indicator values associated with received wireless RF power, and maximum power point (MPP) values associated with converting wireless RF power to DC power,
wherein the processor is configured to access the memory unit and transmit the stored values to a networked device or network.

15. The apparatus of claim 11 further comprising:
a buck-boost converter circuit to provide the client with approximately constant voltage/current; and
a switch configured to switch at least one of the multiple antennas from transmitting the beacon signal to receiving wireless RF power,
wherein the switch is configured to receive a predetermined voltage signal that causes the switch to switch the at least one of the multiple antennas from transmitting the beacon signal to receiving wireless RF power.

16. The apparatus of claim 11 further comprising:
at least three additional rectifying circuits;
a buck-boost converter circuit; and
at least four maximum power point tracking (MPPT) circuits electronically coupled to the rectifying circuit, the at least three additional rectifying circuits, and the buck-boost converter circuit,
wherein the three additional rectifying circuits, the buck-boost converter circuit, and the at least four MPPT circuits are monolithically integrated.

17. The apparatus of claim 11 further comprising means for detecting motion of the apparatus coupled to the processor, the processor configured to cause, in response to detection of the motion, a signal to be transmitted to the WPT to cause the WPT to: stop transmitting wireless power, or reduce a level of wireless RF power being transmitted, to the client device.

18. A method for receiving wireless power at a client device, the method comprising:
receive, using at least one of multiple antennas of the client device, a beacon schedule from a wireless power transmitter (WPT) for beacon broadcasting and radio frequency (RF) power delivery to and from the WPT;
transmitting, from the at least one of the multiple antennas and according to the beacon schedule, a beacon signal including a calibration signal to the WPT,
wherein the WPT employs the calibration signal, at least in part, to generate a waveform for transmitting wireless RF power to the client device using multiple differing and reflecting paths from the WPT to the client device;
receiving, via the multiple antennas, the wireless RF power;
converting the wireless RF power to direct current (DC) power to power the client device; and
monitoring received power and modifying an operating voltage of the client device based on the monitored power.

19. The method of claim 18, further comprising:
determining the client device has limited available battery power;
in response to determining the client device has limited available battery power, implementing a cold start algorithm,
wherein the cold start algorithm causes the client device to turn off or operate in a low power consumption mode until the client device determines the battery has sufficient power to operate the client device.

20. The method of claim 18 further comprising:
determining a first antenna of the multiple antennas is receiving more power than another antenna of the multiple antennas, and
in response to determining the first antenna is receiving more power than a second antenna, switching the second antenna to receiving communication data or stopping conversion of wireless RF power received from the second antenna, and
at the client device, switching at least one of the multiple antennas from receiving wireless RF power to transmitting the beacon signal.

21. The method of claim 18 further comprising:
sending received wireless RF power values associated with the multiple antennas to a cloud storage device.

* * * * *